(12) United States Patent
Inatani et al.

(10) Patent No.: US 7,103,894 B2
(45) Date of Patent: Sep. 5, 2006

(54) DISK LOADING MECHANISM, AND DISK RECORDING AND/OR REPRODUCING DEVICE

(75) Inventors: Akihisa Inatani, Kanagawa (JP); Toshiyuki Kuroiwa, Kanagawa (JP); Takeshi Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 373 days.

(21) Appl. No.: 10/451,796

(22) PCT Filed: Nov. 15, 2002

(86) PCT No.: PCT/JP02/11970

§ 371 (c)(1),
(2), (4) Date: Feb. 11, 2004

(87) PCT Pub. No.: WO03/042997

PCT Pub. Date: May 22, 2003

(65) Prior Publication Data

US 2004/0133901 A1     Jul. 8, 2004

(30) Foreign Application Priority Data

Nov. 15, 2001   (JP)   ............................. 2001-350007

(51) Int. Cl.
*G11B 17/04* (2006.01)
(52) U.S. Cl. ...................... 720/625; 720/624
(58) Field of Classification Search ................ 720/622, 720/623, 624, 625
See application file for complete search history.

(56) References Cited

U.S. PATENT DOCUMENTS 4,682,320 A * 7/1987 d'Alayer de Costemore d'Arc ... 720/622
5,255,255 A * 10/1993 Kaneda et al. ............... 720/621
5,416,763 A * 5/1995 Ohsaki ........................ 720/623
5,544,148 A * 8/1996 Nakamichi ................ 360/98.07
5,561,658 A * 10/1996 Nakamichi et al. ......... 720/703
6,137,761 A * 10/2000 Oh et al. ..................... 720/623

FOREIGN PATENT DOCUMENTS

| JP | 61-210556 | 9/1986 |
| JP | 4-195854 | 7/1992 |
| JP | 04195857 A * | 7/1992 |

* cited by examiner

*Primary Examiner*—William Korzuch
*Assistant Examiner*—Christopher R. Magee
(74) *Attorney, Agent, or Firm*—Oblon, Spivak, McClelland, Maier & Neustadt, P.C.

(57) ABSTRACT

A disk loading apparatus includes first and second main gears (35, 43) disposed at equal distances to each other in radial directions from the center of rotation of a disk table (85) which is the center of rotation of a disk-type recording medium at an insertion completion position of the disk-type recording medium, and first and second feed rollers (38, 46) provided at positions on the first and second main gears (35, 43) displaced from the centers of rotation of the first and second main gears (35, 43) for rolling on an outer circumferential face of the disk-type recording medium (100). The disk loading apparatus further includes a driving mechanism for rotating the first and second main gears (35, 43) such that, when the disk-type recording medium (100) is to be moved toward the insertion completion position, the first and second feed rollers (38, 46) revolve on the first and second main gears (35, 43), respectively, while the first and second feed rollers (38, 46) roll on the outer circumferential face of the disk-type recording medium (100).

31 Claims, 33 Drawing Sheets

DISK LOADING MECHANISM, AND DISK RECORDING AND/OR REPRODUCING DEVICE

This application is a 371 of PCT/JP02/11970 Nov. 15, 2002

TECHNICAL FIELD

This invention relates to a disk loading mechanism and a disk recording and/or reproduction apparatus. More specifically, the present invention relates to a technical field relating to a disk loading mechanism for feeding a disk-type recording medium inserted through a disk slot to a mounting position for mounting the disk-type recording medium onto a disk table and a disk recording and/or reproduction apparatus which includes the disk loading mechanism.

BACKGROUND ART

Disk recording and/or reproduction apparatus are available which can perform recording, reproduction or both of recording and reproduction of an information signal onto and/or from a disk-type recording medium such as a magneto-optical disk. Some of such disk recording and/or reproduction apparatus can perform recording and/or reproduction of an information signal onto and/or from both of a disk-type recording medium having a diameter of 8 cm and another disk-type recording medium having another diameter of 12 cm.

In such disk-type recording and/or reproduction apparatus, a disk-type recording medium is mounted onto the disk table by a method wherein such mounting is performed manually or another method wherein such mounting is performed automatically using a disk loading mechanism.

In order to implement the method wherein mounting is performed manually, some disk recording and/or reproduction apparatus are configured such that the disk table has engaging pawls mounted for resilient displacement in radial directions on the disk table such that, when a disk-type recording medium having a diameter of 8 cm or another disk-type recording medium having another diameter of 12 cm is pressed at an inner circumferential edge thereof against the engaging pawls, the engaging pawls are resiliently displaced to allow the disk-type recording medium to be mounted onto the disk table.

In order to implement the method wherein mounting is performed automatically, some disk recording and/or reproduction apparatus of the tray type which have a disk tray supported for drawing out movement on a body section are configured such that a receiving recess for a disk-type recording medium having a diameter of 8 cm and another receiving recess for another disk-type recording medium having another diameter of 12 cm are formed concentrically on the disk tray and, when a disk-type recording medium having the diameter of 8 cm or another disk-type recording medium having the diameter of 12 cm is placed in one of the receiving recesses and the disk tray is accommodated into the body section, the disk-type recording medium is mounted onto the disk table.

In order to implement another method wherein mounting is performed automatically, a disk recoding and/or reproduction apparatus of a slot-in type wherein a disk-type recording medium is inserted through a disk slot formed in a body section is configured such that, when a disk-type recording medium is inserted through the disk slot and drawn into the body section, it is mounted onto the disk table.

However, in the conventional disk recording and/or reproduction apparatus described above wherein a disk-type recording medium is manually mounted onto the disk table, since the inner circumferential edge of the disk-type recording medium is pressed against the engaging pawls, there is the possibility that the inner circumferential edge may be damaged or the disk-type recording medium may be deformed.

Meanwhile, in the conventional disk recording and/or reproduction apparatus described above wherein a disk-type recording medium is mounted automatically onto the disk table, irrespective of whether the disk recording and/or reproduction apparatus is of the tray type or the slot-in type, a disk-type recording medium is mounted onto the disk table after it is mechanically or electrically detected whether the disk-type recording medium is a disk-type recording medium having the diameter of 8 cm or another disk-type recording medium having the diameter of 12 cm or an outer circumferential edge of the disk-type recording medium is held down by control means to control the position of the disk-type recording medium. Therefore, those disk-type recording media which can be mounted onto the disk table are limited to a disk-type recording medium having the diameter of 8 cm and another disk-type recording medium having the diameter of 12 cm.

However, while increase of the recording density on a disk-type recording medium and diversification of recording media proceed further in the future, in addition to disk-type recording media having the diameters of 8 cm and 12 cm, various disk-type recording media having various diameters may be placed on the market with a high degree of possibility. However, such conventional disk recording and/reproduction apparatus as described above cannot cope with such various disk-type recording media having various diameters as described above.

Therefore, it is a subject of the present invention to provide a disk loading mechanism and a disk recording and/or reproduction apparatus which overcome the problem described above and can prevent occurrence of a malfunction upon mounting of a disk-type recording medium onto a disk table and besides allows mounting of a disk-type recording medium onto the disk table irrespective of the size of the disk-type recording medium.

DISCLOSURE OF INVENTION

In order to solve the subject described above, each of a disk loading mechanism and a disk recording and/or reproduction apparatus is configured such that it includes a pair of main gears for being rotated around centers of rotation positioned at equal distances to each other in radial directions of a disk table from a center of rotation of the disk table, and a pair of feed rollers supported for rotation at portions of the pair of main gears other than the centers of rotation for contacting with a disk-type recording medium and rolling on an outer circumferential face of the disk-type recording medium to feed the disk-type recording medium toward a mounting position, and that, when the disk-type recording medium is to be fed toward the mounting position by the pair of feed rollers, the main gears are rotated, based on the rotation of the feed rollers, around the centers of rotation thereof in directions same as the directions of rotation of the feed rollers and the feed rollers are revolved around the centers of rotation of the main gears in response to the rotation of the main gears.

Accordingly, in the disk loading mechanism and the disk recording and/or reproduction apparatus, the pair of feed rollers are rotated to feed the disk-type recording medium toward the mounting position.

BEST MODE FOR CARRYING OUT THE INVENTION

In the following, an embodiment of the present invention is described with reference to the accompanying drawings. It is to be noted that, in the embodiment described below, the present invention is applied to a disk reproduction apparatus which performs reproduction of an information signal recorded on a disk-type recording medium such as an optical disk and a disk loading apparatus provided in the disk reproduction apparatus.

Figure 1:
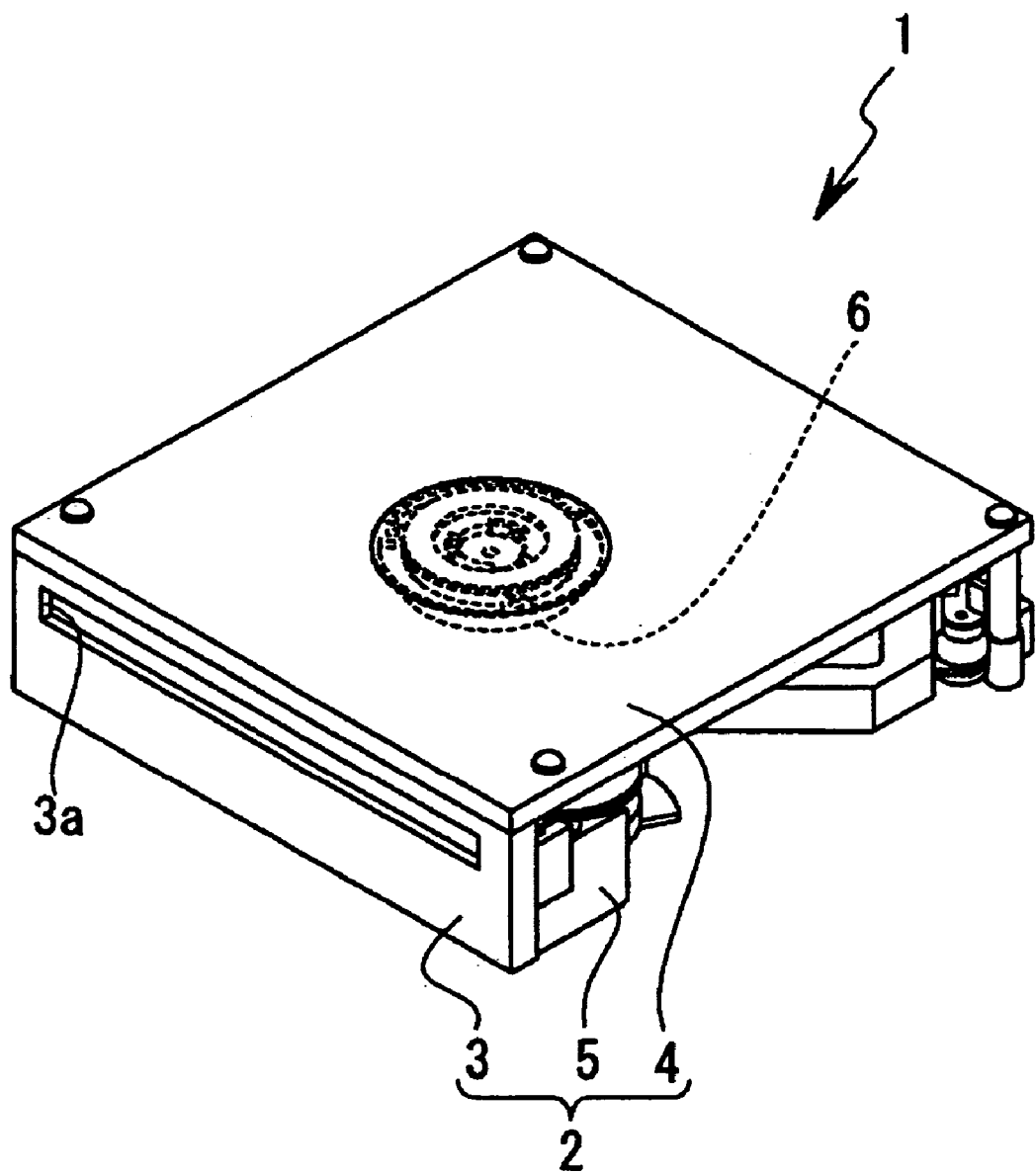
FIG. 1 shows an embodiment of the present invention together with FIGS. 2 to 33 and is a perspective view of a disk reproduction apparatus to which the present invention is applied.
Figure 2:
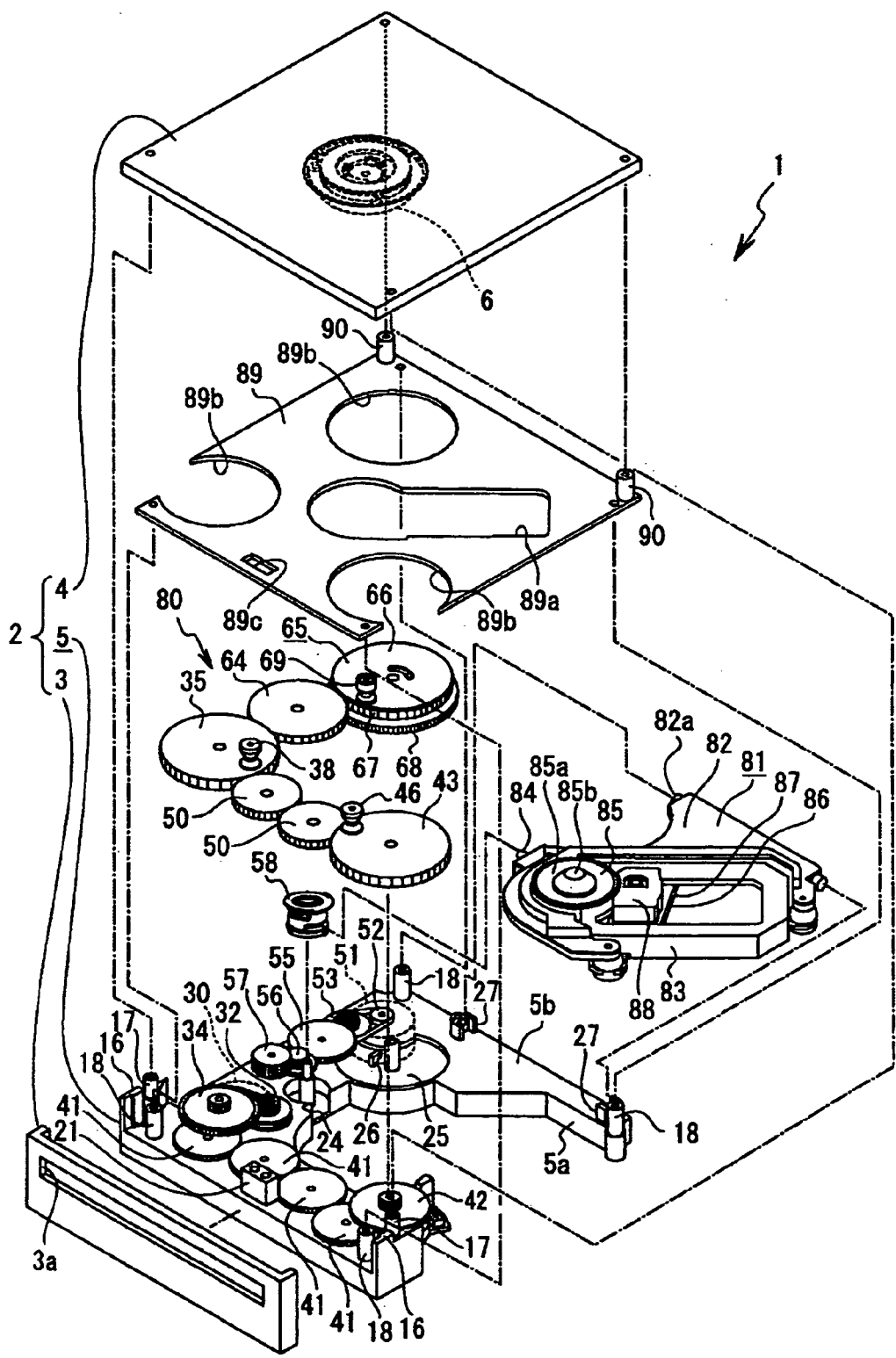
FIG. 2 is an exploded perspective view of the disk reproduction apparatus.

The disk reproduction apparatus 1 includes required members and mechanisms disposed in a housing 2, and the housing 2 includes a front panel 3, a top panel 4 and a mechanism chassis 5 (refer to FIGS. 1 and 2).

The front panel 3 has a horizontally elongated disk slot 3a formed therein.

The top panel 4 is formed as a flat plate and has a chucking pulley 6 attached to a lower face at a substantially central portion thereof.

Figure 3:
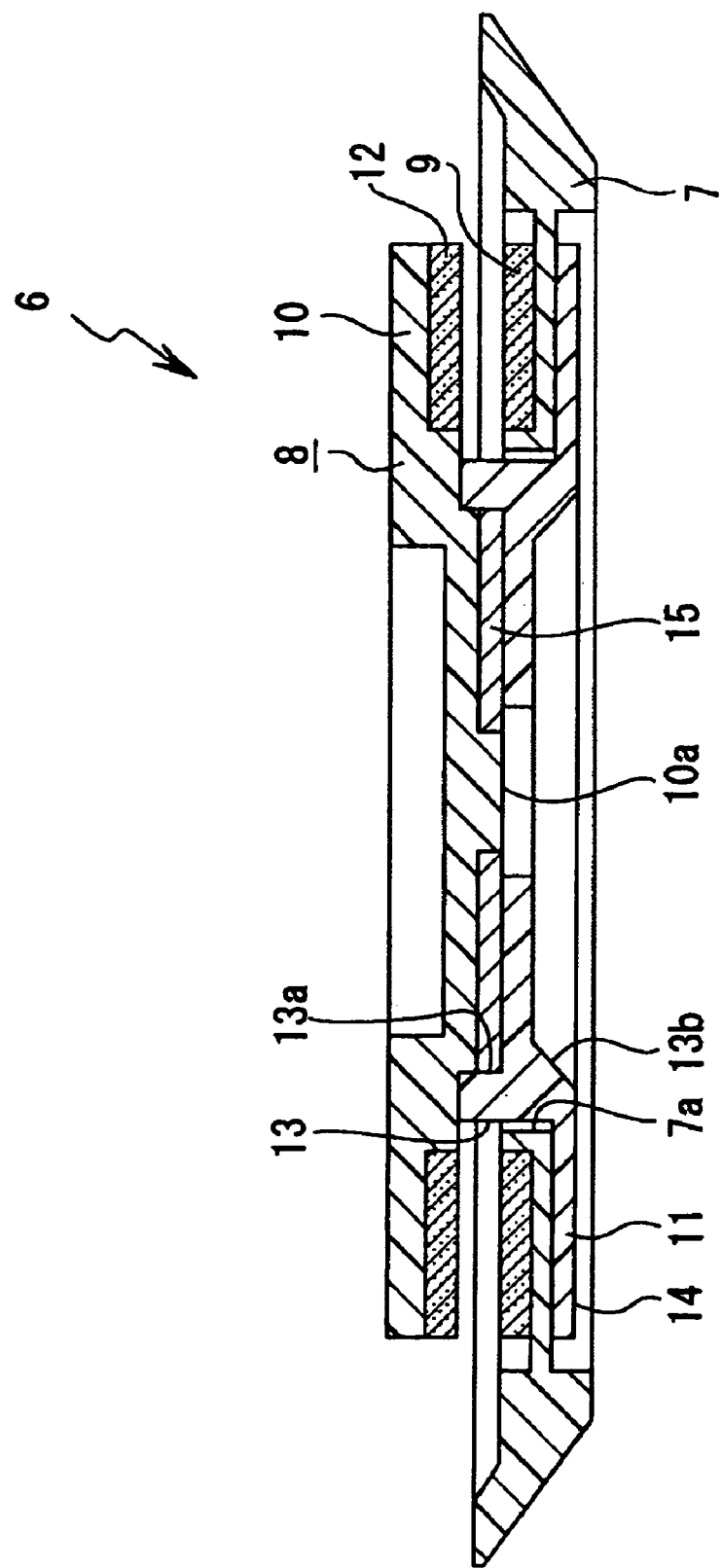
FIG. 3 is an enlarged sectional view of a chucking pulley.

The chucking pulley 6 includes a pulley 8 supported on a pulley support member 7 (refer to FIG. 3).

The pulley support member 7 has a support hole 7a formed at a central portion thereof and has an annular magnet 9 attached to an upper face of an inner circumferential side thereof.

The pulley 8 includes a holding member 10 and a stabilizer 11 coupled above and below to each other. The holding member 10 is substantially in the form of a circular plate and has a downwardly projecting fitting projection 10a provided at a central portion thereof. The holding member 10 has an annular magnet 12 attached to a lower face of an outer circumferential side portion thereof.

The stabilizer 11 includes a shaft portion 13 and a sandwiching portion 14 formed integrally with the shaft portion 13 and extending outwardly from a lower edge of the shaft portion 13. A mounting recess 13a open upwardly and an insertion recess 13b open downwardly are formed in the shaft portion 13. An annular metal plate 15 is attached to the mounting recess 13a.

The pulley 8 is formed such that the shaft portion 13 of the stabilizer 11 is attached to the holding member 10. In a state wherein the pulley 8 is formed, the fitting projection 10a of the holding member 10 is fitted in a center hole of the metal plate 15.

The shaft portion 13 of the pulley 8 is inserted in the support hole 7a of the pulley support member 7 such that the pulley 8 is supported for movement in an axial direction and for rotation around the axis thereof. In a state wherein the pulley 8 is supported on the pulley support member 7, the magnet 12 mounted on the holding member 10 and the magnet 9 mounted on the pulley support member 7 are positioned in an opposing relationship to each other above and below. The magnet 9 and the magnet 12 are magnetized such that the faces thereof opposing to each other have the same polarity so that the pulley support member 7 and the pulley 8 are biased in directions in which they move away from each other. Accordingly, in a state wherein the metal plate 15 is not attracted to a magnet of a disk table hereinafter described, the pulley 8 is positioned to a movement end on the upper side with respect to the pulley support member 7 and the stabilizer 11 contacts from below with the pulley support member 7.

Figure 4:
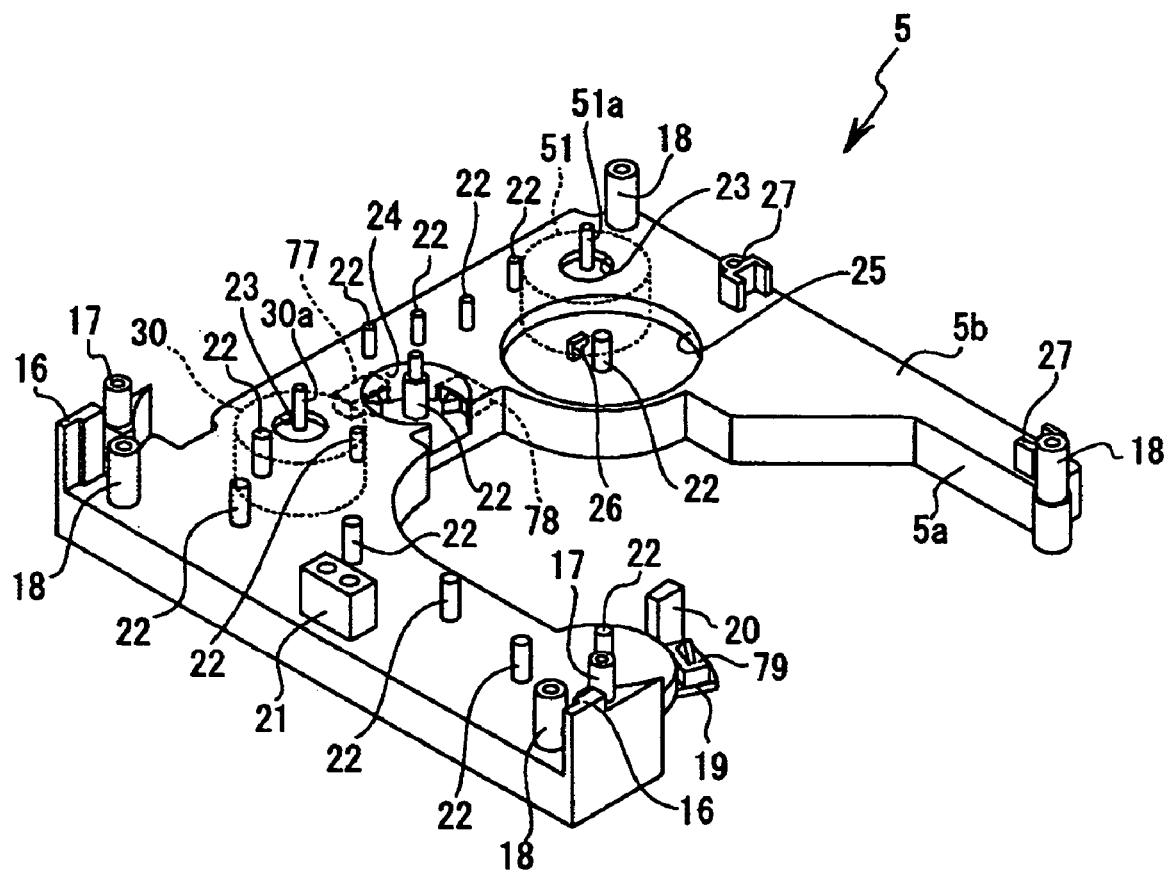
FIG. 4 is a perspective view showing a mechanism chassis in a state wherein motors and detection switches are attached thereto.
Figure 5:
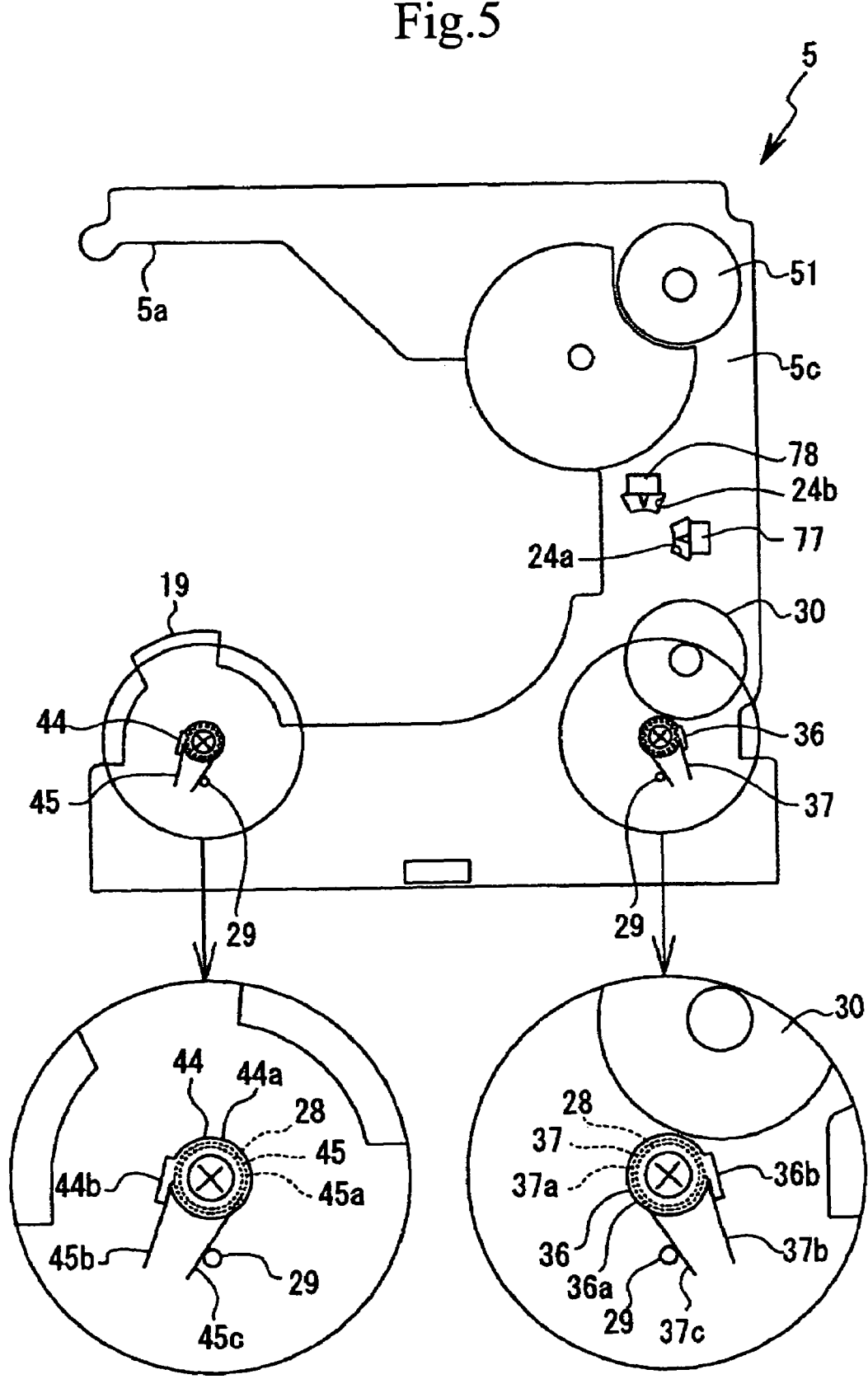
FIG. 5 is a bottom plan view showing the mechanism chassis in a state wherein the motors, the detection switches, control members and torsion coil springs are disposed thereon.

The mechanism chassis 5 is in the form of a flat plate and has an arrangement recess 5a formed therein such that it opens rightwardly (refer to FIGS. 4 and 5). A pair of upright walls 16, 16 are provided at the opposite left and right side edges at a front end portion of an upper face 5b of the mechanism chassis 5, and upwardly projecting panel attaching bosses 17, 17 are provided on the upright walls 16, 16. Upwardly projecting plate mounting bosses 18, 18, . . . are provided at the four corners of the upper face 5b of the mechanism chassis 5.

A rearwardly projecting arrangement projection 19 is provided at a position displaced toward a right end of a front end portion of the mechanism chassis 5, and an upwardly projecting stopper wall 20 is provided on a left edge of the arrangement projection 19 such that it projects upwardly.

A disk detection sensor 21 is attached to a front end portion of a central portion in the leftward and rightward direction of the upper face 5b of the mechanism chassis 5. A plurality of upwardly projecting gear support shafts 22, 22, . . . are provided at predetermined positions on the upper face 5b of the mechanism chassis 5.

A pair of shaft insertion holes 23, 23 are formed at positions rather near to a left end of the mechanism chassis 5 in a spaced relationship from each other in the forward and backward directions. A first support recess 24 is formed in the mechanism chassis 5 between the shaft insertion holes 23, 23, and switch arrangement holes 24a and 24b are formed in a spaced relationship from each other in a circumferential direction in the mechanism chassis 5 such that they are communicated with the first support recess 24 (refer to FIG. 5). A second support recess 25 is formed at a position of the mechanism chassis 5 on the rear side of the first support recess 24. A gear support shaft 22 is provided at a central portion of the second support recess 25, and a spring anchoring piece 26 is provided in the proximity of the gear support shaft 22.

A pair of support projections 27, 27 are disposed in a leftwardly and rightwardly spaced relationship from each other at a rear end portion of the upper face 5b of the mechanism chassis 5.

A pair of downwardly projecting spring support shafts 28, 28 are provided in a leftwardly and rightwardly spaced relationship from each other at positions rather near to the front end of a lower face 5c of the mechanism chassis 5, and a pair of downwardly projecting spring anchoring pins 29, 29 are provided in the proximity of the spring support shafts 28, 28 (refer to FIG. 5). The spring support shafts 28, 28 are provided coaxially with the gear support shafts 22, 22 positioned in a leftwardly and rightwardly spaced relationship most from each other at positions rather near to the front end of the upper face 5b.

Figure 6:
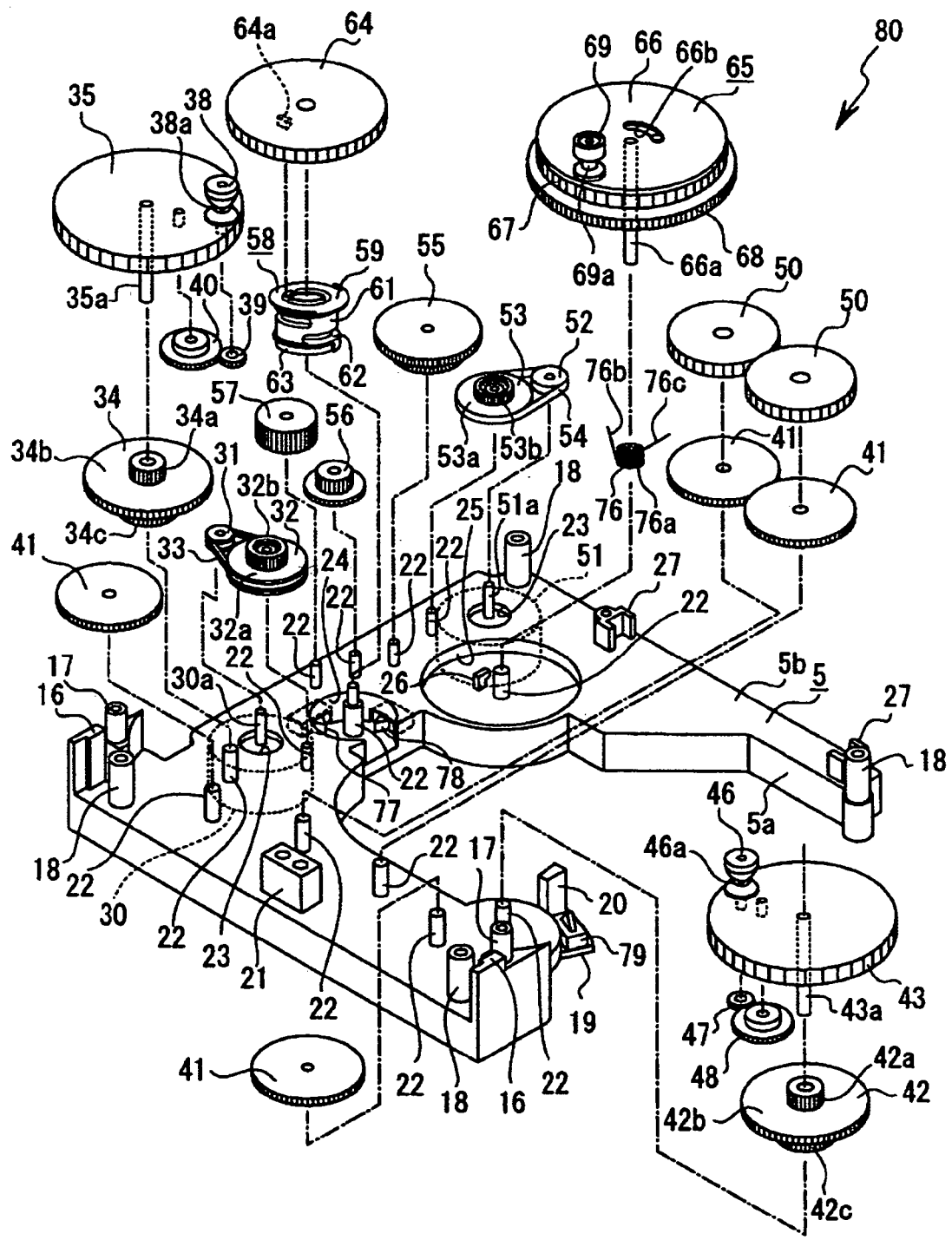
FIG. 6 is an exploded perspective view showing an internal mechanism of the disk reproduction apparatus.
Figure 7:
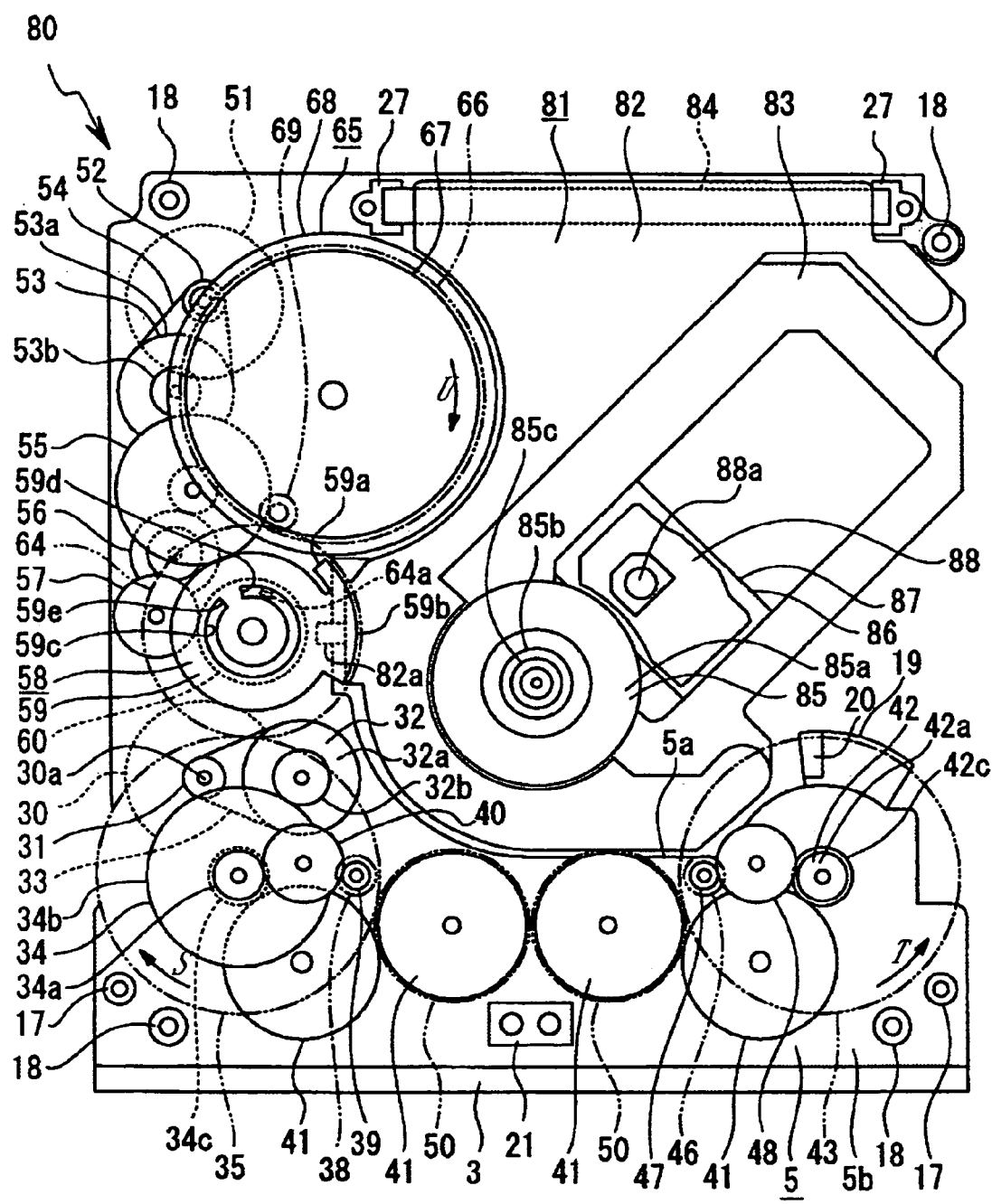
FIG. 7 is a plan view showing the internal mechanism of the disk reproduction apparatus.

Various motors and various gears are disposed at different positions on the mechanism chassis 5 (refer to FIGS. 6 and 7).

Figure 8:
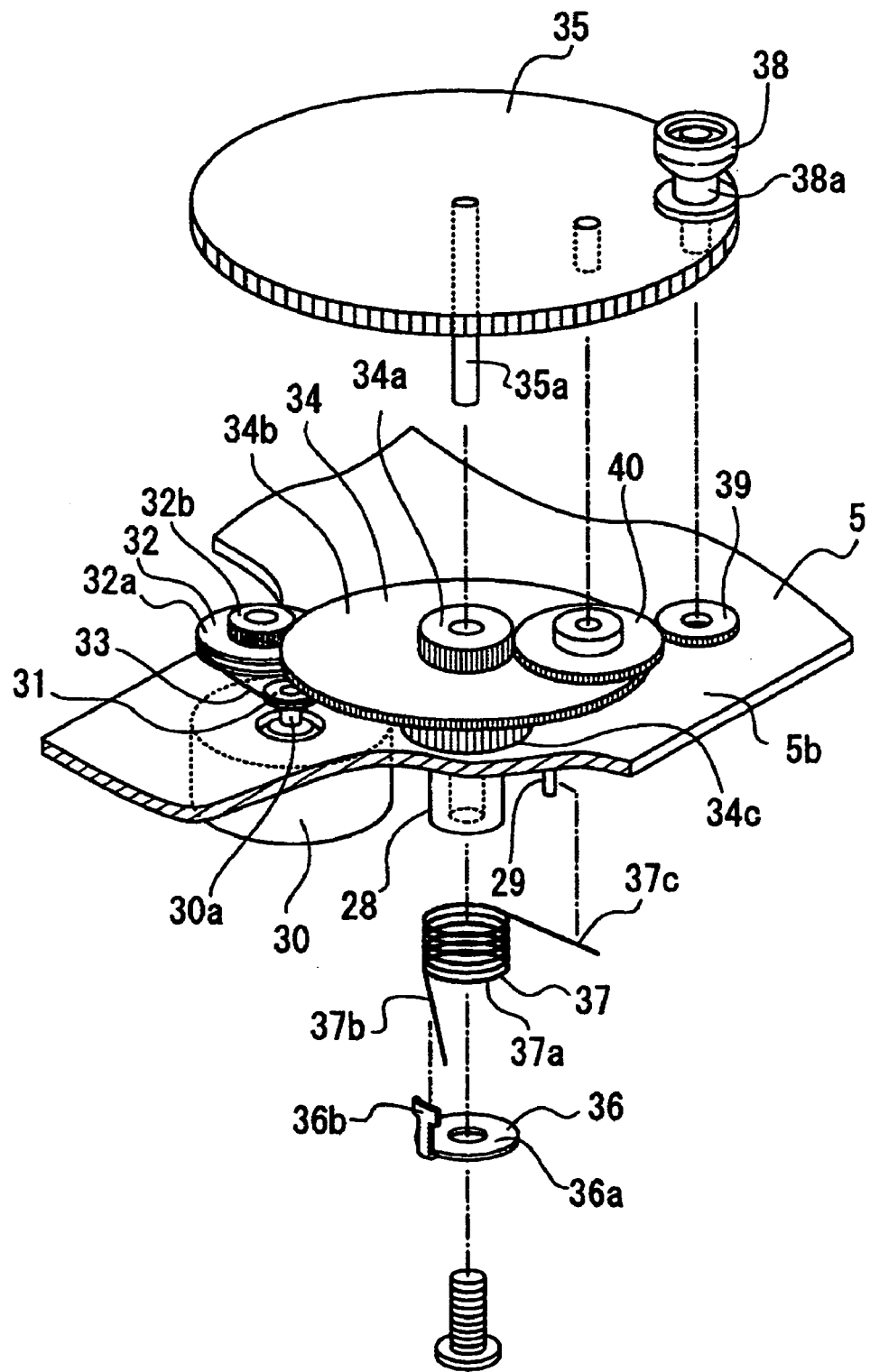
FIG. 8 is an enlarged perspective view showing essential part of the disk reproduction apparatus partly in a disassembled state.

A feed motor 30 is attached to a substantially central portion in the forward and backward direction of a left end portion of the lower face 5c of the mechanism chassis 5, and a motor shaft 30a of the feed motor 30 projects upwardly from the shaft insertion hole 23 on the front side (refer to FIGS. 6 to 8). A pulley 31 is secured to the motor shaft 30a of the feed motor 30.

A pulley gear 32 is supported on the gear support shaft 22 positioned on the right side of the pulley 31 (refer to FIGS. 6 to 8). The pulley gear 32 includes a pulley portion 32a positioned on the upper side and a gear portion 32b positioned on the lower side and formed integrally with the pulley portion 32a, and a belt 33 extends between and around the pulley portion 32a and the pulley 31.

An intermediate gear 34 is supported on the gear support shaft 22 positioned on the front side of the pulley gear 32 (refer to FIGS. 6 to 8). The intermediate gear 34 includes a sun gear portion 34a of a small diameter positioned on the upper side, a large gear portion 34b of a large diameter positioned on the lower side of the sun gear portion 34a, and a small gear portion 34c positioned on the lower side of the large gear portion 34b, all formed integrally with each other. The large gear portion 34b is held in meshing engagement with the gear portion 32b of the pulley gear 32.

The gear support shaft 22 having the intermediate gear 34 supported thereon has a main gear 35 supported thereon on the upper side of the intermediate gear 34 (refer to FIGS. 6 to 8). A downwardly projecting support shaft portion 35a is provided at a central portion of the main gear 35 and is fitted in a center hole formed in the gear support shaft 22. The support shaft portion 35a projects downwardly at a lower end portion thereof from the spring support shaft 28 provided coaxially with the gear support shaft 22, and has a control member 36 attached to a lower face thereof by means of a screw (refer to FIGS. 5 and 8).

The control member 36 has an attached portion 36a in the form of a circular plate attached to the support shaft portion 35a and a spring anchoring portion 36b formed integrally with the attached portion 36a and projecting from an outer circumferential edge of the attached portion 36a.

A torsion coil spring 37 is supported at a coil portion 37a thereof by the spring support shaft 28, and an end portion 37b of the torsion coil spring 37 resiliently contacts with the spring anchoring portion 36b of the control member 36 while the other end portion 37c of the torsion coil spring 37 resiliently contacts with a spring anchoring pin 29 provided on the lower face 5c of the mechanism chassis 5. Accordingly, the main gear 35 is biased in the clockwise direction (S direction shown in FIG. 7) as viewed in plan by the torsion coil spring 37.

A feed roller 38 is supported for rotation on an outer peripheral edge of an upper face of the main gear 35 (refer to FIGS. 6 to 8). The feed roller 38 is formed from, for example, a rubber material and has a constricted portion 38a formed at an intermediate portion thereof in the upward and downward direction. A feed gear 39 is supported coaxially with the feed roller 38 on the lower face of the main gear 35, and the feed roller 38 rotates integrally with the feed gear 39 when the feed gear 39 rotates.

A planet gear 40 is supported on a lower face of the main gear 35 and held in meshing engagement with the sun gear portion 34a of the intermediate gear 34 and the feed gear 39 (refer to FIGS. 7 and 8). Accordingly, when the intermediate gear 34 is rotated, the planet gear 40 is rotated, and the feed gear 39 and the feed roller 38 are rotated integrally by the rotation of the planet gear 40.

Connection gears 41, 41, . . . are supported on the four gear support shafts 22, 22, . . . provided in a leftwardly and rightwardly spaced relationship from each other in the leftward and rightward directions at a front end portion of the mechanism chassis 5. The connection gears 41, 41, . . . are held in meshing engagement in order with each other (refer to FIGS. 6 and 7). The connection gear 41 positioned at the leftmost position is held in meshing engagement with the small gear portion 34c of the intermediate gear 34.

Figure 9:
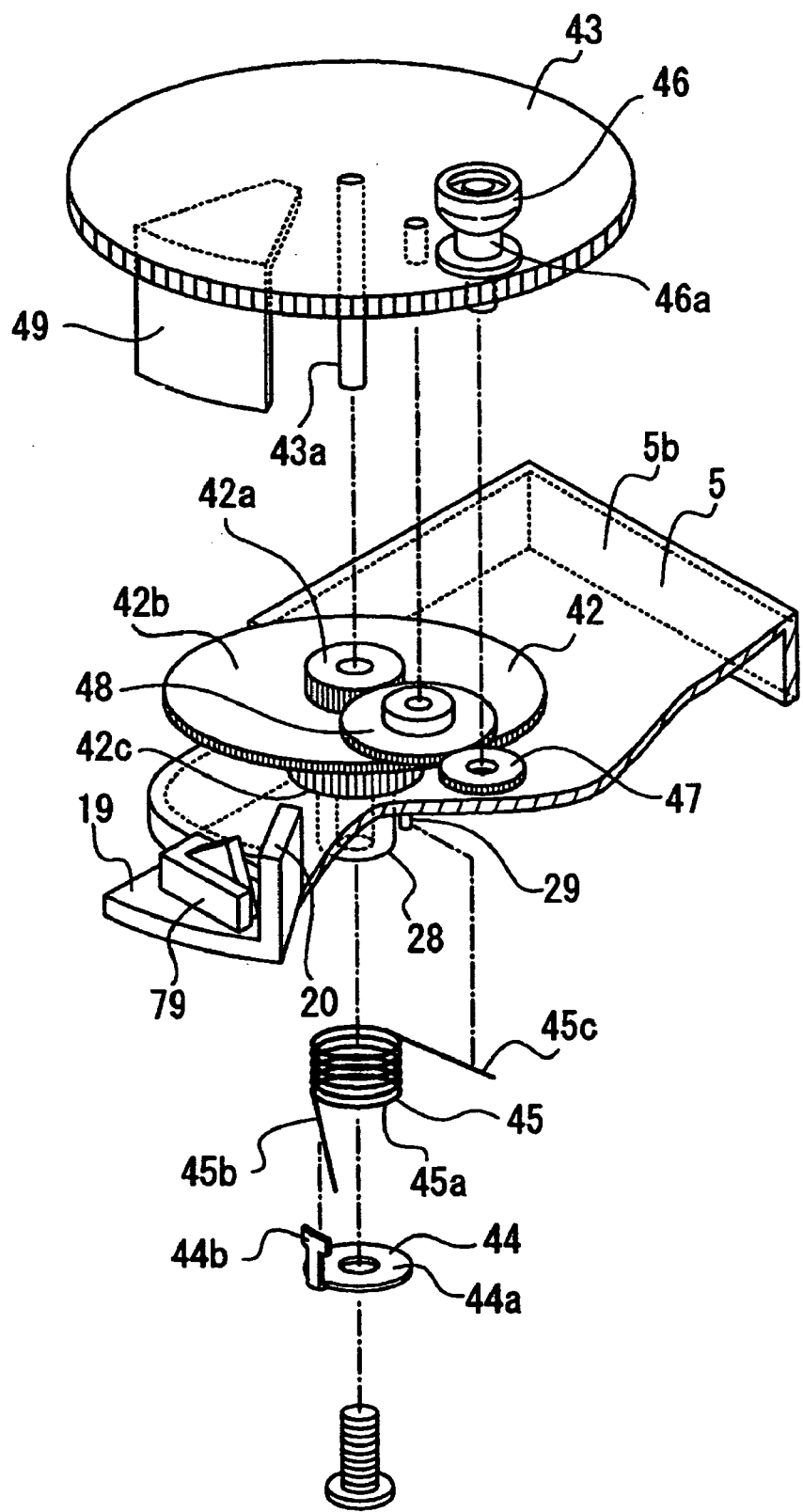
FIG. 9 is an enlarged perspective view showing different essential part of the disk reproduction apparatus partly in a disassembled state.

An intermediate gear 42 is supported on the gear support shaft 22 provided at a right end portion of a front end portion of the mechanism chassis 5 (refer to FIGS. 6, 7 and 9). The intermediate gear 42 has a sun gear portion 42a of a small diameter positioned on the upper side, a large gear portion 42b of a large diameter positioned on the lower side of the sun gear portion 42a, and a small gear portion 42c positioned on the lower side of the large gear portion 42b, all formed integrally with each other.

The connection gear 41 positioned at the rightmost position is held in meshing engagement with the small gear portion 42c of the intermediate gear 42 (refer to FIG. 7).

A main gear 43 is supported on the gear support shaft 22, on which the intermediate gear 42 is supported, on the upper side of the intermediate gear 42 (refer to FIGS. 6, 7 and 9). A downwardly projecting support shaft portion 43a is provided at a central portion of the main gear 43 and extends through a center hole formed in the gear support shaft 22. The support shaft portion 43a projects at a lower end portion thereof downwardly through the spring support shaft 28 provided coaxially with the gear support shaft 22, and a control member 44 is attached to a lower face of the support shaft portion 43a by means of a screw (refer to FIGS. 5 and 9).

The control member 44 includes an attached portion 44a having an annular shape and attached to the support shaft portion 43a, and a spring anchoring portion 44b projecting from an outer circumferential edge of the attached portion 44a.

A torsion coil spring 45 is supported at a coil portion 45a thereof on the spring support shaft 28 and resiliently contacts at a end portion 45b thereof with the spring anchoring portion 44b of the control member 44 while it resiliently contacts at the other end portion 45c thereof with the spring anchoring pin 29 provided on the lower face 5c of the mechanism chassis 5. Accordingly, the main gear 43 is biased in the counterclockwise direction (T direction shown in FIG. 7) as viewed in plan by the torsion coil spring 45.

A feed roller 46 is supported for rotation on an outer circumferential edge of an upper face of the main gear 43 (refer to FIGS. 6, 7 and 9). The feed roller 46 is formed from, for example, a rubber material and has a constricted portion 46a formed at an intermediate portion thereof in the upward and downward direction. A feed gear 47 is supported on the lower face of the main gear 43 coaxially with the feed roller 46, and when the feed gear 47 rotates, the feed roller 46 is rotated integrally.

A planet gear 48 is supported on the lower face of the main gear 43 and kept in meshing engagement with the sun gear portion 42a of the intermediate gear 42 and the feed gear 47 (refer to FIGS. 7 and 9). Accordingly, when the intermediate gear 42 is rotated, the planet gear 48 is rotated, and the feed gear 47 and the feed roller 46 are rotated integrally by the rotation of the planet gear 48.

A downwardly projecting operation projection 49 is attached to the lower face of the main gear 43 (refer to FIG. 9).

On the center side two gear support shafts 22, 22 from among the gear support shafts 22, 22, . . . on which the connection gears 41, 41, . . . are supported, synchronous gears 50, 50 which function as synchronization means are supported in a mutually meshing relationship on the upper side of the connection gears 41, 41, . . . (refer to FIGS. 6 and 7). The left side synchronous gear 50 is held in meshing engagement with the main gear 35 positioned on the left side while the synchronous gear 50 on the right side is held in meshing engagement with the main gear 43 positioned on the right side.

When the feed motor 30 is rotated, driving force of the feed motor 30 is transmitted successively by the pulley 31, belt 33, pulley gear 32, intermediate gear 34, planet gear 40 and feed gear 39 so that the feed roller 38 supported on the main gear 35 positioned on the left side is rotated. Simultaneously, the driving force of the feed motor 30 is transmitted successively by the pulley 31, belt 33, pulley gear 32, intermediate gear 34, connection gears 41, 41, . . . , intermediate gear 42, planet gear 48 and feed gear 47 so that the feed roller 46 supported on the main gear 43 positioned on the right side is rotated in synchronism with the feed roller 38.

When a disk-type recording medium 100 is inserted through the disk slot 3a of the front panel 3, the feed roller 38 and the feed roller 46 roll on an outer circumferential face of the disk-type recording medium 100 to feed the disk-type recording medium 100 rearwardly. However, since the positions at which the feed roller 38 and the feed roller 46 contact with the outer circumferential face of the disk-type recording medium 100 vary every moment, the distance between the feed rollers 38 and 46 varies in accordance with the moved position of the disk-type recording medium 100. At this time, the main gear 35 positioned on the left side is rotated in the counterclockwise direction as viewed in plan against the biasing force of the torsion coil spring 37 while the main gear 43 positioned on the right side is rotated in the clockwise direction as viewed in plan against the biasing force of the torsion coil spring 45. Since the main gear 35 and the main gear 43 are held in meshing engagement with each other through the synchronous gears 50, 50, they are rotated in synchronism with each other.

On the other hand, when the disk-type recording medium 100 is to be discharged from the disk slot 3a of the front panel 3, the feed roller 38 and the feed roller 46 roll on the outer circumferential face of the disk-type recording medium 100 to feed the disk-type recording medium 100 forwardly, and similarly as described above, the distance between the feed rollers 38 and 46 varies in accordance with the moved position of the disk-type recording medium 100. At this time, the main gear 35 positioned on the left side is rotated in the clockwise direction as viewed in plan while the main gear 43 positioned on the right side is rotated in the counterclockwise direction as viewed in plan. Since the main gear 35 and the main gear 43 are held in meshing engagement with each other through the synchronous gears 50, 50, they are rotated in synchronism with each other.

A drive motor 51 is attached to a rear end portion of a left end portion of the lower face 5c of the mechanism chassis 5, and a motor shaft 51a of the drive motor 51 projects upwardly through the shaft insertion hole 23 on the rear side (refer to FIGS. 5 to 7). A pulley 52 is secured to the motor shaft 51a of the drive motor 51.

A pulley gear 53 is supported on the gear support shaft 22 positioned on the front side of the pulley 52 (refer to FIGS. 6 and 7). The pulley gear 53 includes a gear portion 53a positioned on the upper side and a pulley portion 53b positioned on the lower side of the gear portion 53a and formed integrally with the gear portion 53a. A belt 54 extends between and around the pulley portion 53b and the pulley 52.

A pair of speed reducing gears 55 and 56 are supported on the two gear support shafts 22, 22 positioned on the front side of the pulley gear 53 (refer to FIGS. 6 and 7). A spur gear 57 is supported on the gear support shaft 22 positioned on the front side of the speed reducing gear 56 positioned on the front side and is held in meshing engagement with the speed reducing gear 56.

Figure 10:
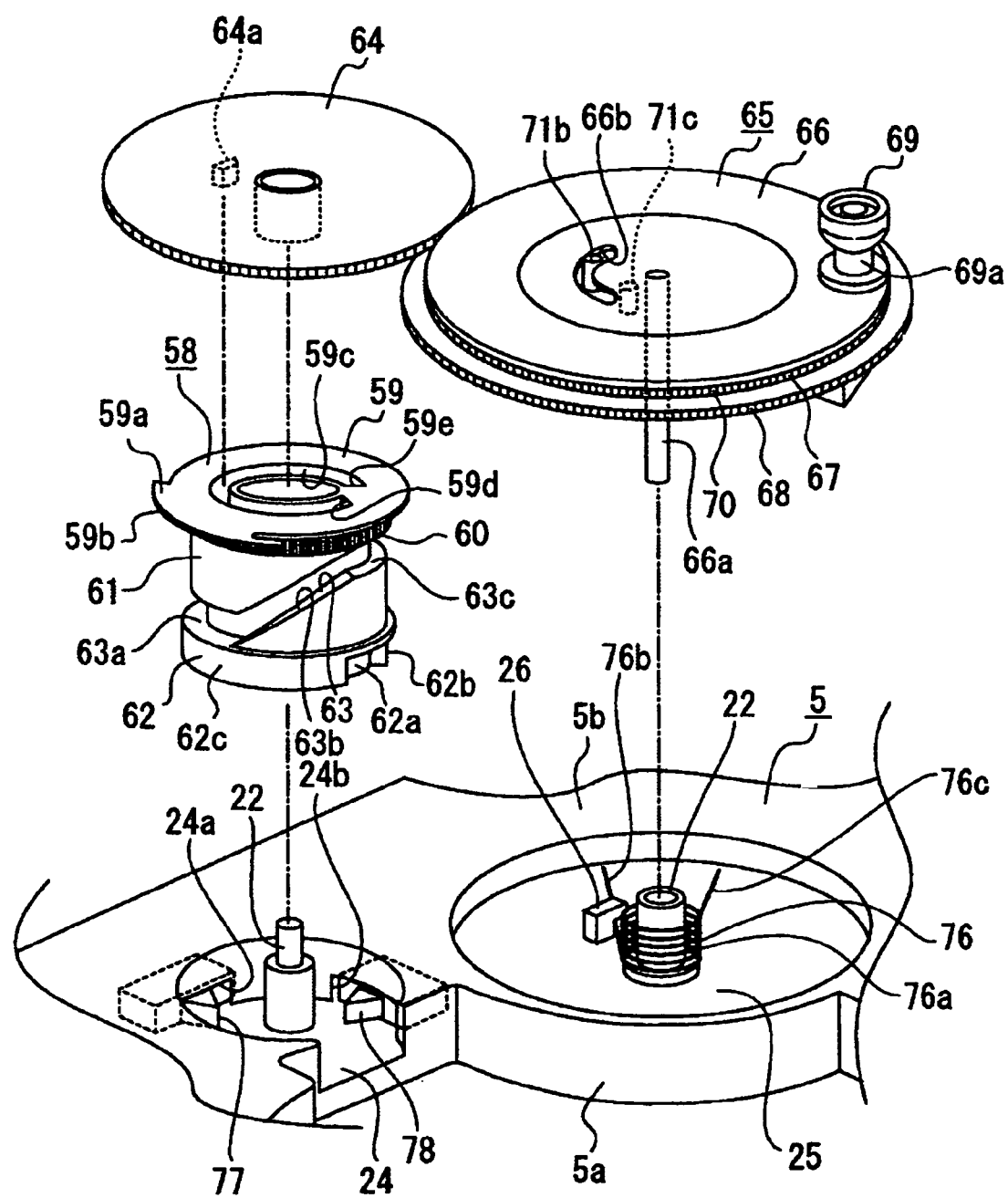
FIG. 10 is an enlarged perspective view of further different essential part of the disk reproduction apparatus partly in a disassembled state.

A cam gear 58 is supported on the gear support shaft 22 provided in the first support recess 24 of the mechanism chassis 5 (refer to FIGS. 6, 7 and 10). The cam gear 58 includes a flat plate portion 59, a gear portion 60, a cam portion 61 and a switching portion 62 formed integrally with each other and positioned in order from the upper side (refer to FIG. 10).

Figure 11:
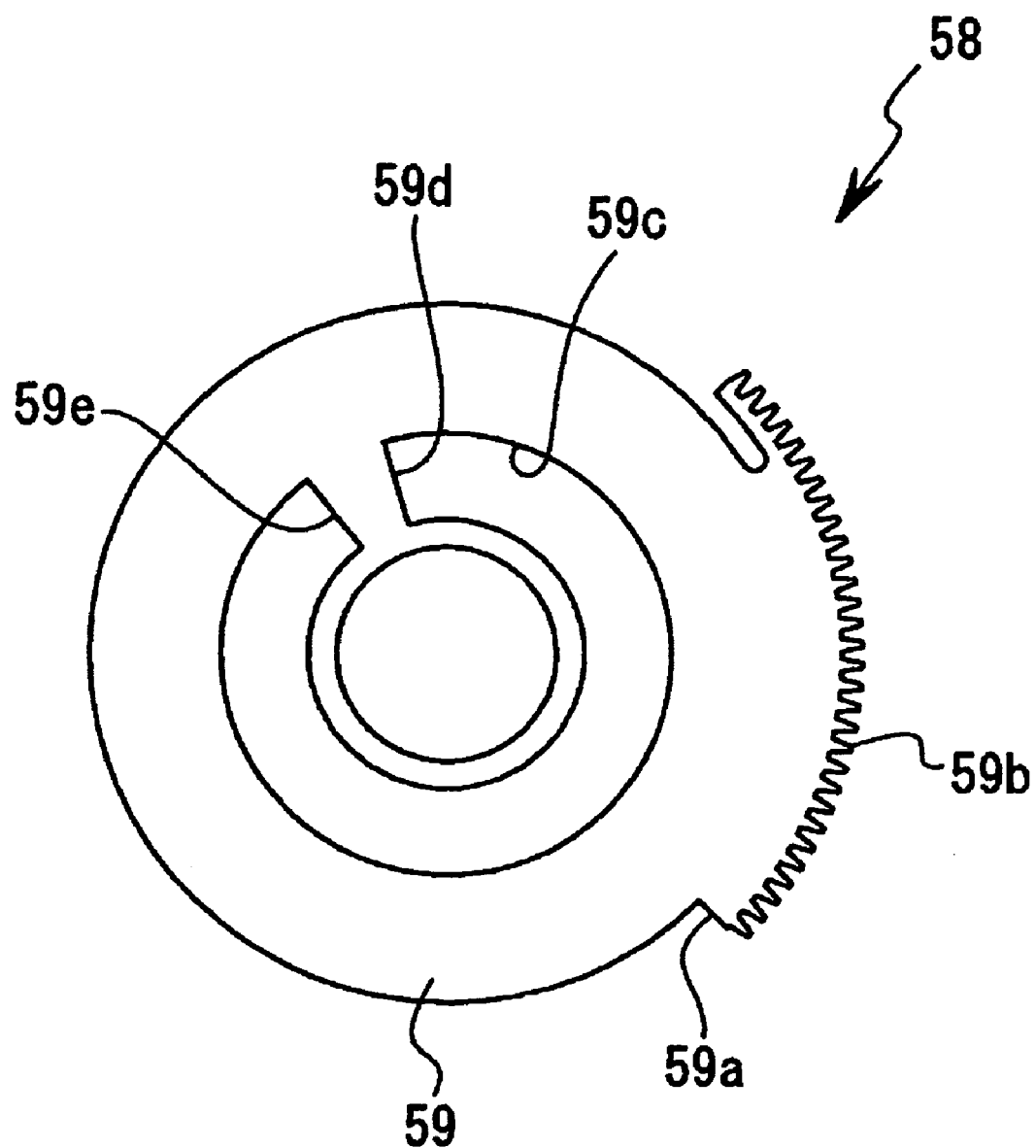
FIG. 11 is an enlarged plan view of a cam gear.

The flat plate portion 59 has a substantially annular shape of a small thickness, and a gear projection 59a projects from a portion of an outer circumferential edge of the flat plate portion 59 (refer to FIGS. 10 and 11). A mating gear 59b is formed on an outer circumferential face of the gear projection 59a. A circumferentially extending sliding groove 59c is formed on an upper face of the flat plate portion 59 and has a shape of an arc corresponding to a central angle of approximately 350°. The opposite ends of the sliding groove 59c in a circumferential direction are individually formed as a first wall face 59d and a second wall face 59e.

The gear portion 60 is positioned immediately on the lower side of the flat plate portion 59 and is formed with a diameter smaller than that of the flat plate portion 59. The gear portion 60 has gear teeth formed over an overall circumference thereof (refer to FIG. 10).

The cam portion 61 is formed in a cylindrical shape having a diameter substantially equal to that of the gear portion 60 and has a cam groove 63 formed on an outer circumferential face thereof (refer to FIG. 10). The cam groove 63 includes a lower cam groove portion 63a, an inclined cam groove portion 63b and an upper cam groove portion 63c formed continuously to each other. The lower cam groove portion 63a is formed long in a horizontal direction while the inclined cam groove portion 63b is inclined such that it is displaced upwardly as the distance from the lower cam groove portion 63a increases, and the upper cam groove portion 63c is formed long in a horizontal direction.

Figure 12:
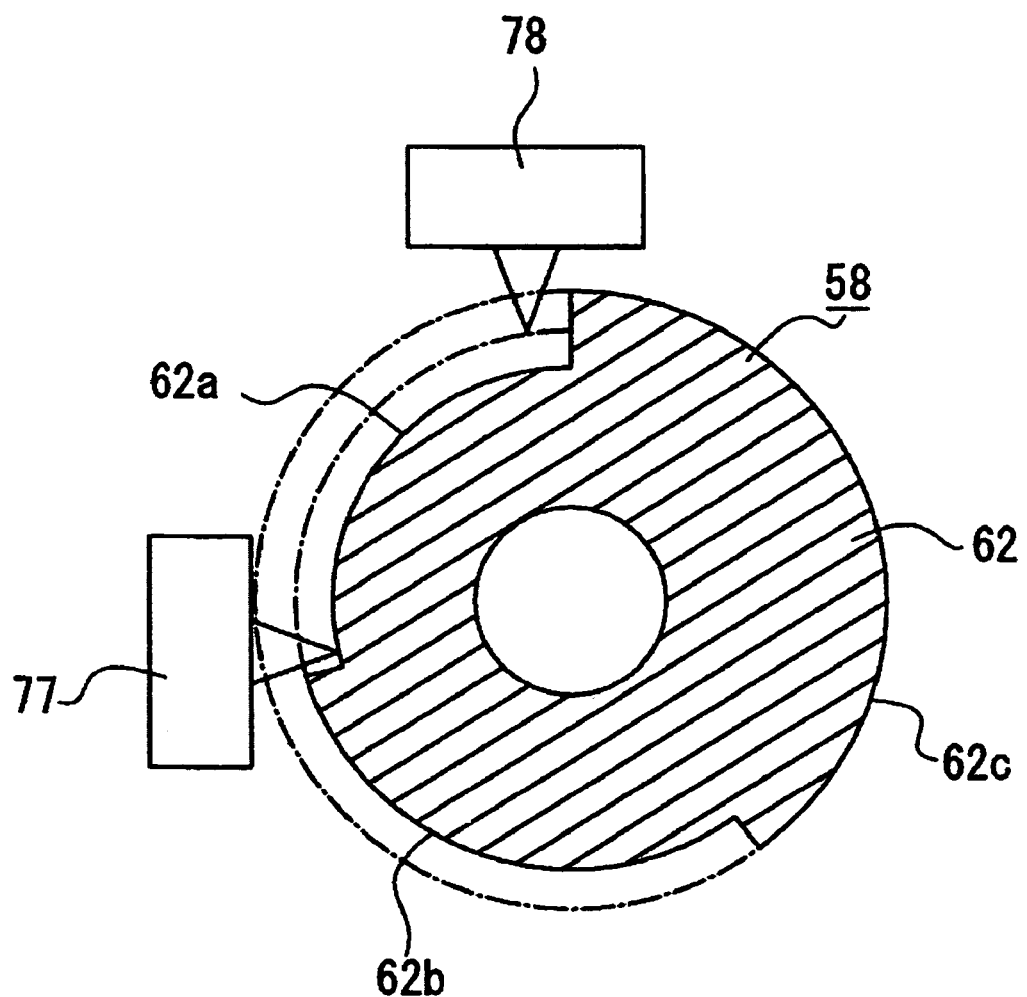
FIG. 12 is a conceptive view showing a positional relationship between a switching portion of the cam gear and detection switches.

The switching portion 62 is formed short in an axial direction and has three portions having different diameters extending in a circumferential direction (refer to FIGS. 10 and 12). The smallest diameter portion is formed as an inactive portion 62a and has a length corresponding to a central angle of approximately 100°, and the portion having the intermediate diameter is formed as an intermediate active portion 62b and has a length corresponding to a central angle of approximately 130° while the greatest diameter portion is formed as an active portion 62c and has a length corresponding to a central angle of approximately 130°.

The cam gear 58 is held in meshing engagement at the gear portion 60 thereof with the spur gear 57 (refer to FIG. 7).

An interlocking gear 64 is supported on the gear support shaft 22, on which the cam gear 58 is supported, on the upper side of the cam gear 58 (refer to FIGS. 6, 7 and 10). A downwardly projecting sliding projection 64a is provided at a position of a lower face of the interlocking gear 64 displaced to the outer circumference side from the axis of rotation of the interlocking gear 64.

A sub gear 65 is supported on the gear support shaft 22 provided in the second support recess 25 of the mechanism chassis 5 (refer to FIGS. 6, 7 10 and 13). The sub gear 65 is formed from a combination of a circular plate portion 66, a limiter gear 67 and a switching gear 68 (refer to FIGS. 10 and 13).

A downwardly projecting support shaft portion 66a is provided at a central portion of the circular plate portion 66 and is fitted in and supported by a center hole formed in the gear support shaft 22. An arcuately extending escapement hole 66b is formed at a position rather near to the center of the circular plate portion 66. A downwardly projecting spring support pin 66c is provided on the lower face of the circular plate portion 66 on the immediately outer side of the escapement hole 66b. Downwardly projecting mounting bosses 66d, 66d, 66d are provided in a spaced relationship from each other in a circumferential direction on an outer circumferential edge of the lower face of the circular plate portion 66.

A control roller 69 which functions as a control section for controlling the movement of the disk-type recording medium 100 is supported for rotation on an outer peripheral edge of the upper face of the circular plate portion 66. The control roller 69 is constricted at an intermediate portion thereof in the upward and downward direction to form a constricted portion 69a.

The limiter gear 67 includes an outer circumferential portion 70 and an inner circumferential portion 71 formed integrally with the outer circumferential portion 70 and provided to project downwardly farther than the outer circumferential portion 70. Arcuate arrangement holes 70a, 70a, 70a are formed in a spaced relationship from each other in a circumferential direction in the outer circumferential portion 70. An arcuately extending escapement hole 71a is formed at a position rather near to the center of the inner circumferential portion 71. An upwardly projecting spring support pin 71b is provided on an upper face of the inner circumferential portion 71 on the immediately inner side of the escapement hole 71a. A downwardly projecting spring anchoring shaft 71c is provided on a lower face of the inner circumferential portion 71 on the immediately inner side of the escapement hole 71a.

The support shaft portion 66a of the circular plate portion 66 is inserted into a central portion of the limiter gear 67 from above and the limiter gear 67 is supported for rotation on the circular plate portion 66. In a state wherein the limiter gear 67 is supported on the circular plate portion 66, the mounting bosses 66d, 66d, 66d of the circular plate portion 66 are individually disposed in the arrangement holes 70a, 70a, 70a and the spring support pin 66c of the circular plate portion 66 is disposed in the escapement hole 71a of the limiter gear 67 while the spring support pin 71b of the limiter gear 67 is disposed in the escapement hole 66b of the circular plate portion 66 (refer to FIG. 14).

Figure 13:
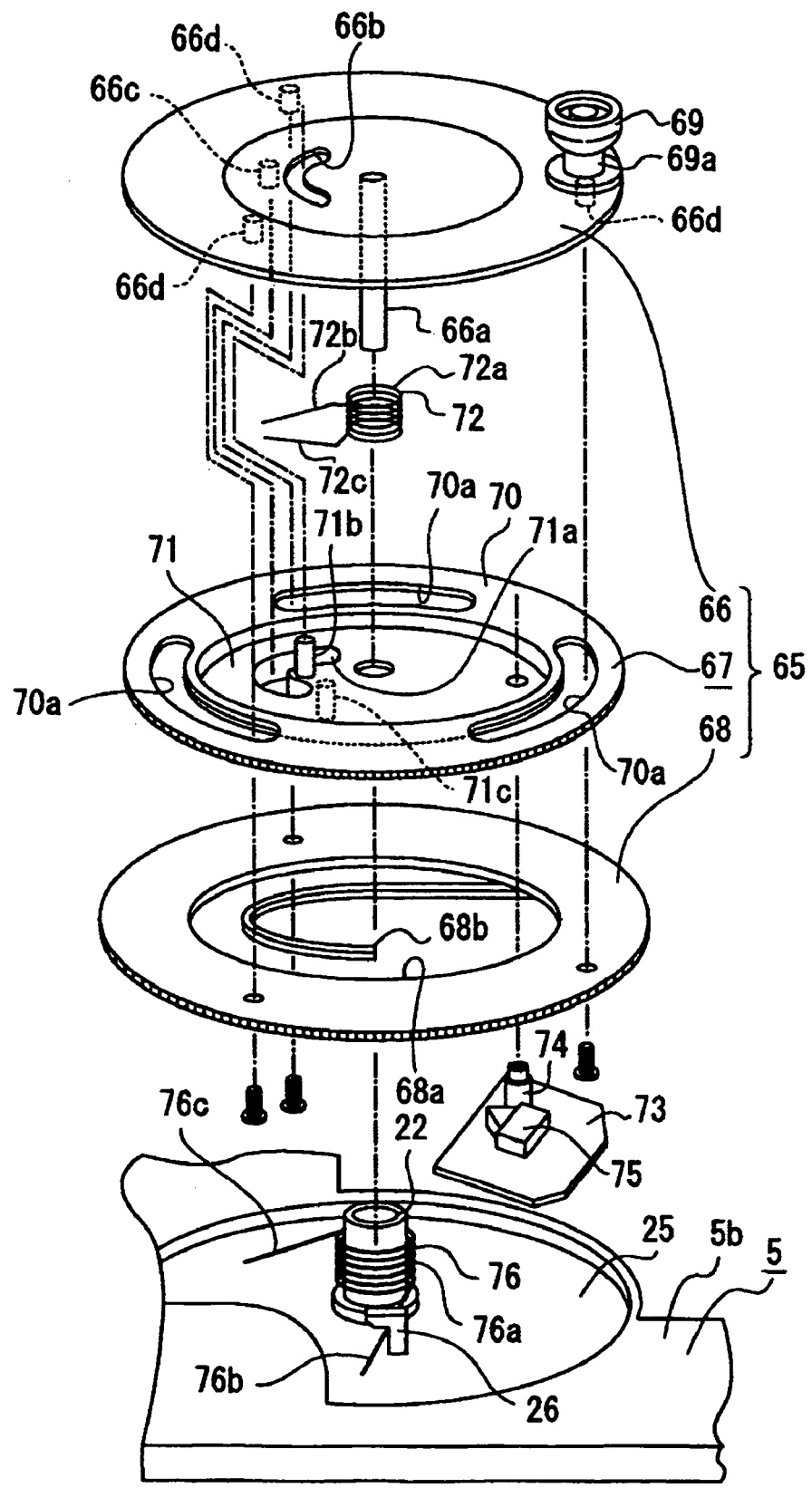
FIG. 13 is an enlarged exploded perspective view of a sub gear.
Figure 14:
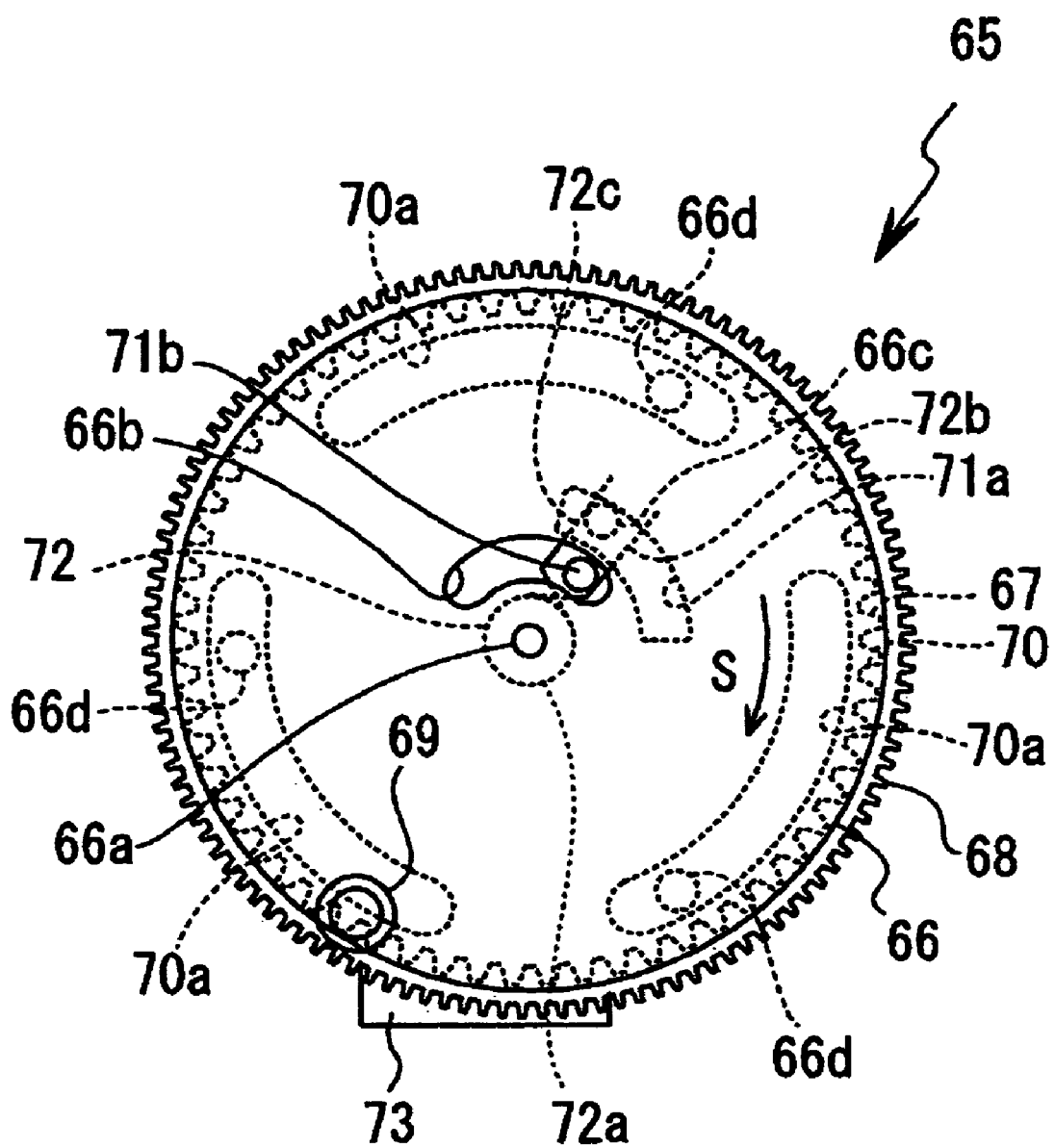
FIG. 14 is an enlarged plan view of the sub gear.

In the state wherein the limiter gear 67 is supported on the circular plate portion 66, a limiter spring 72 in the form of a torsion coil spring is supported at a coil portion 72a thereof on the support shaft portion 66a of the circular plate portion 66 (refer to FIGS. 13 and 14). An end portion 72b and the other end portion 72c of the limiter spring 72 are engaged in a spanning state with the spring support pin 66c of the circular plate portion 66 and the spring support pin 71b of the limiter gear 67. Accordingly, when the circular plate portion 66 is rotated in the counterclockwise direction as viewed in plan with respect to the limiter gear 67, the circular plate portion 66 is biased in the clockwise direction (S direction shown in FIG. 14) with respect to the limiter gear 67.

Figure 15:
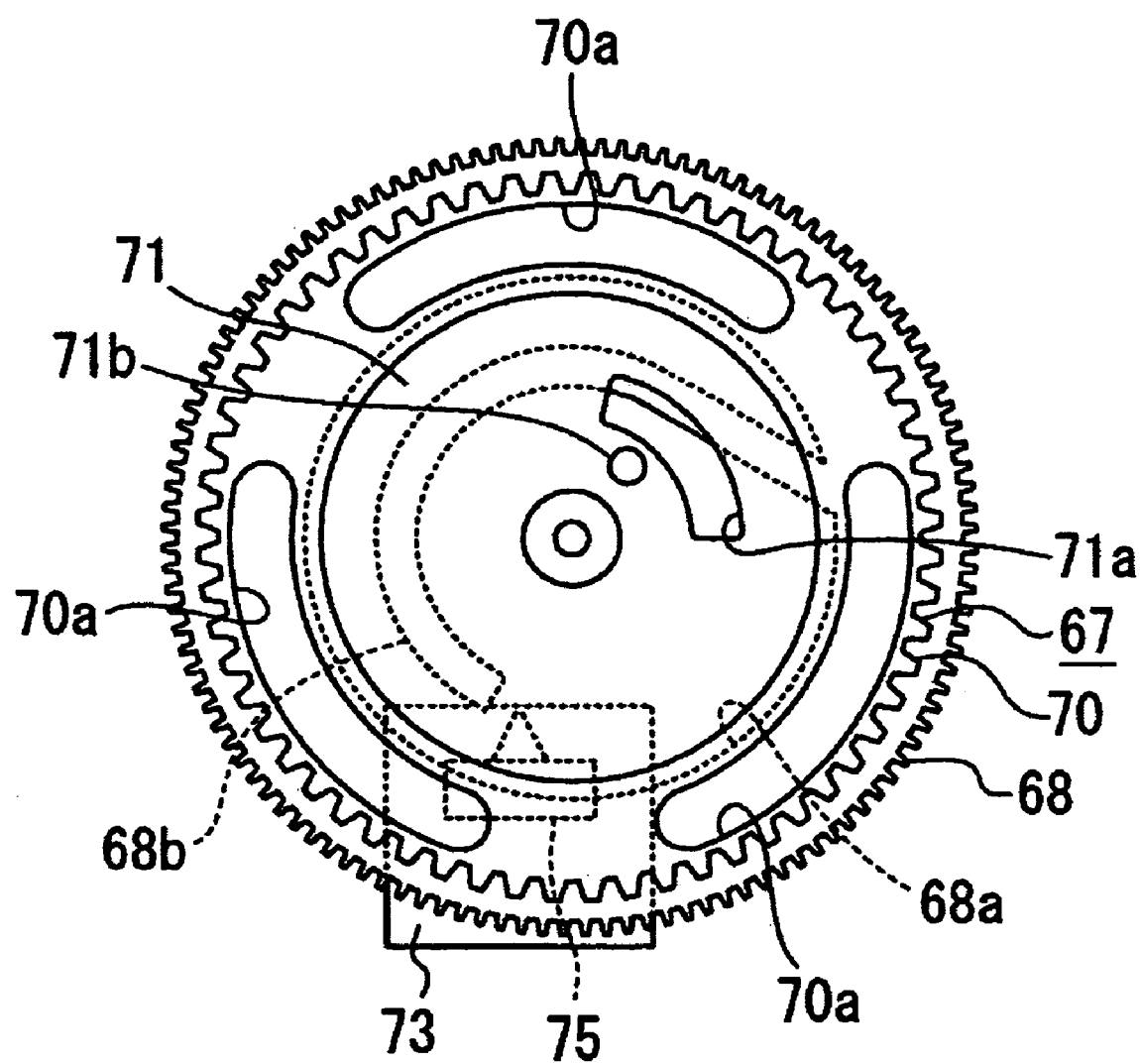
FIG. 15 is an enlarged plan view showing the sub gear in a state wherein a circular plate portion thereof is removed.

The switching gear 68 is formed in an annular shape and has a fitting hole 68a formed at a central portion thereof (refer to FIGS. 13 and 15). A switch pressing projection 68b is provided on a lower face of the switching gear 68 such that it projects toward the fitting hole 68a side. The switch pressing projection 68b is formed in an arcuate shape at an end portion thereof.

The limiter gear 67 is fitted at the inner circumferential portion 71 thereof in the fitting hole 68a of the switching gear 68, and the switching gear 68 is secured to the mounting bosses 66d, 66d, 66d of the circular plate portion 66 by means of screws.

A switch mounting plate 73 is mounted on a lower face of the limiter gear 67 through a mounting shaft 74 fitted in the fitting hole 68a of the switching gear 68 (refer to FIGS. 13 and 15). A first detection switch 75 is mounted on the switch mounting plate 73 and has two detection modes of ON and OFF.

In a state wherein the circular plate portion 66, limiter gear 67 and switching gear 68 are combined to form the sub gear 65 as described above, a tip end of the switch pressing projection 68b of the switching gear 68 is positioned in the proximity of an operated element of the first detection switch 75 (refer to FIG. 15).

In the state wherein the sub gear 65 is supported on the gear support shaft 22 provided in the second support recess 25 of the mechanism chassis 5, a coil portion 76a of a torsion coil spring 76 is supported on the gear support shaft 22 (refer to FIGS. 10 and 13). The torsion coil spring 76 resiliently contacts at an end portion 76b thereof with the spring anchoring piece 26 provided in the second support recess 25 and resiliently contacts at the other end portion 76c thereof with the spring anchoring shaft 71c of the limiter gear 67. Accordingly, the sub gear 65 is biased in the clockwise direction (U direction in FIG. 7) as viewed in plan by the torsion coil spring 76.

The interlocking gear 64 is held in meshing engagement with the limiter gear 67 of the sub gear 65 and the main gear 35 (refer to FIG. 7).

The mating gear 59b of the cam gear 58 is positioned at a height at which it can mesh with the switching gear 68 of the sub gear 65.

When the drive motor 51 is rotated, the driving force of the drive motor 51 is transmitted in order through the pulley 52, belt 54, pulley gear 53, speed reducing gears 55 and 56, spur gear 57 and cam gear 58, and after the cam gear 58 is rotated until the mating gear 59b is brought into meshing engagement with the switching gear 68, the sub gear 65 is rotated.

Further, when the main gear 35 and the main gear 43 are rotated in synchronism with each other as described above, the rotating force of them is transmitted to the sub gear 65 through the interlocking gear 64 so that the sub gear 65 is rotated in synchronism with the main gear 35 and the main gear 43.

A second detection switch 77 and a third detection switch 78 are mounted at a substantially central portion in the forward and backward direction of a left end portion of the mechanism chassis 5 on the lower face 5c side (refer to FIGS. 4, 5, 6 and 10). Each of the second detection switch 77 and the third detection switch 78 has three detection modes of ON (High), ON (Low) and OFF.

The second detection switch 77 is mounted at a position below the spur gear 57, and an operated element of the second detection switch 77 projects through the switch arrangement hole 24a of the mechanism chassis 5 into the first support recess (refer to FIG. 10). The third detection switch 78 is mounted at a position below a right side portion of the speed reducing gear 56, and an operated element of the third detection switch 78 projects through the switch arrangement hole 24b of the mechanism chassis 5 into the first support recess 24 (refer to FIG. 10).

A fourth detection switch 79 is mounted on the arrangement projection 19 of the mechanism chassis 5 (refer to FIG. 9). The fourth detection switch 79 has two detection modes of ON and OFF. The fourth detection switch 79 has an operated element projecting upwardly and is positioned such that the operated element can contact with the operation projection 49 provided on the lower face of the main gear 43.

A disk loading mechanism 80 for loading the disk-type recording medium 100 is formed from the feed motor 30, intermediate gears 34 and 42, main gears 35 and 43, feed rollers 38 and 46, feed gears 39 and 47, planet gears 40 and 48, connection gears 41, 41, . . . , synchronous gears 50, 50, cam gear 58, sub gear 65 and so forth (refer to FIGS. 2, 6 and 7).

A base unit 81 is disposed in the arrangement recess 5a and supported for pivotal motion on the mechanism chassis 5 (refer to FIGS. 2 and 7). The base unit 81 includes a support member 82, a base chassis 83 supported on the support member 82, and several elements mounted or supported on the base chassis 83.

A supported shaft 84 is mounted at a rear end portion of the support member 82 and extends in the leftward and rightward directions, and is supported at the opposite left and right end portions thereof for pivotal motion on the support projections 27, 27 of the mechanism chassis 5. A leftwardly projecting supported pin 82a is provided at a portion rather near to a front end of the support member 82 and is engaged for sliding movement in the cam groove 63 of the cam portion 61 of the cam gear 58.

A spindle motor not shown is mounted at a front end portion of the base chassis 83 such that a motor shaft thereof projects upwardly from the base chassis 83, and a disk table 85 is secured to the motor shaft. The disk table 85 includes a table portion 85a in the form of a circular plate and a centering projection. 85b provided at and projecting upwardly from a central portion of the table portion 85a, and an annular magnet 85c is embedded in the centering projection 85b. The magnet 85c has magnetic force higher than that of the magnets 9 and 12 of the chucking pulley 6.

An optical pickup 86 is supported on the base chassis 83 for movement in a radial direction of the disk-type recording medium 100 mounted on the disk table 85. The optical pickup 86 includes a movable base 87, required optical elements including a light emitting element, a light receiving element and so forth, and a two-axis actuator 88 supported on the movable base 87. An objective lens 88*a* is provided on the two-axis actuator 88.

When the drive motor 51 is rotated, driving force of the drive motor 51 is transmitted in order through the pulley 52, belt 54, pulley gear 53, speed reducing gears 55 and 56, spur gear 57 and cam gear 58, and when the cam gear 58 rotates, the position of the supported pin 82*a* of the base unit 81 varies with respect to the cam groove 63, whereupon the base unit 81 is pivoted around the supported shaft 84 such that the disk table 85 moves substantially in the upward or downward direction.

At a position at the upper movement end of the base unit 81, that is, at a position at which the disk-type recording medium 100 is mounted onto the disk table 85, the distance between the center of rotation of the disk table 85 and the center of rotation of the main gear 35, the distance between the center of rotation of the disk table 85 and the center of rotation of the main gear 43 and the distance between the center of rotation of the disk table 85 and the center of rotation of the sub gear 65 are equal to each other. Further, while the main gears 35 and 43 are rotated in a state wherein a feeding movement of the disk-type recording medium 100 hereinafter described is being performed by the disk loading mechanism 80, the distances between the center of rotation of the disk table 85 and the feed rollers 38 and 46 in this instance are normally equal to each other.

A base plate 89 is attached to the plate mounting bosses 18, 18, . . . of the mechanism chassis 5 (refer to FIG. 2).

The base plate 89 has formed therein an arrangement hole 89*a* elongated in one direction, gear arrangement holes 89*b*, 89*b*, 89*b* positioned around the arrangement hole 89*a*, and a passing hole + positioned at a central portion in the leftward and rightward direction of a front end portion. Upwardly projecting panel attaching bosses 90, 90 are provided at the opposite left and right end portions of a rear end portion of the base plate 89.

The base plate 89 is attached to the plate mounting bosses 18, 18, . . . of the mechanism chassis 5 by means of screws. In the state wherein the base plate 89 is attached to the plate mounting bosses 18, 18, . . . , the disk table 85 and the optical pickup 86 are disposed in register with the arrangement hole 89*a*, and the main gear 35, main gear 43 and circular plate portion 66 of the sub gear 65 are disposed individually in the gear arrangement holes 89*b*, 89*b*, 89*b*. Accordingly, the feed rollers 38 and 46 and the control roller 69 supported on the main gears 35 and 43 and the sub gear 65, respectively, project upwardly from the base plate 89.

In the state wherein the base plate 89 is attached to the plate mounting bosses 18, 18, . . . , the disk detection sensor 21 provided at a front end portion of the mechanism chassis 5 is disposed below the passing hole 89*c*.

In the state wherein the base plate 89 is attached to the plate mounting bosses 18, 18, . . . , the top panel 4 is attached to the panel attaching bosses 17, 17 of the mechanism chassis 5 and the panel attaching bosses 90, 90 of the base plate 89 (refer to FIG. 2).

Figure 16:
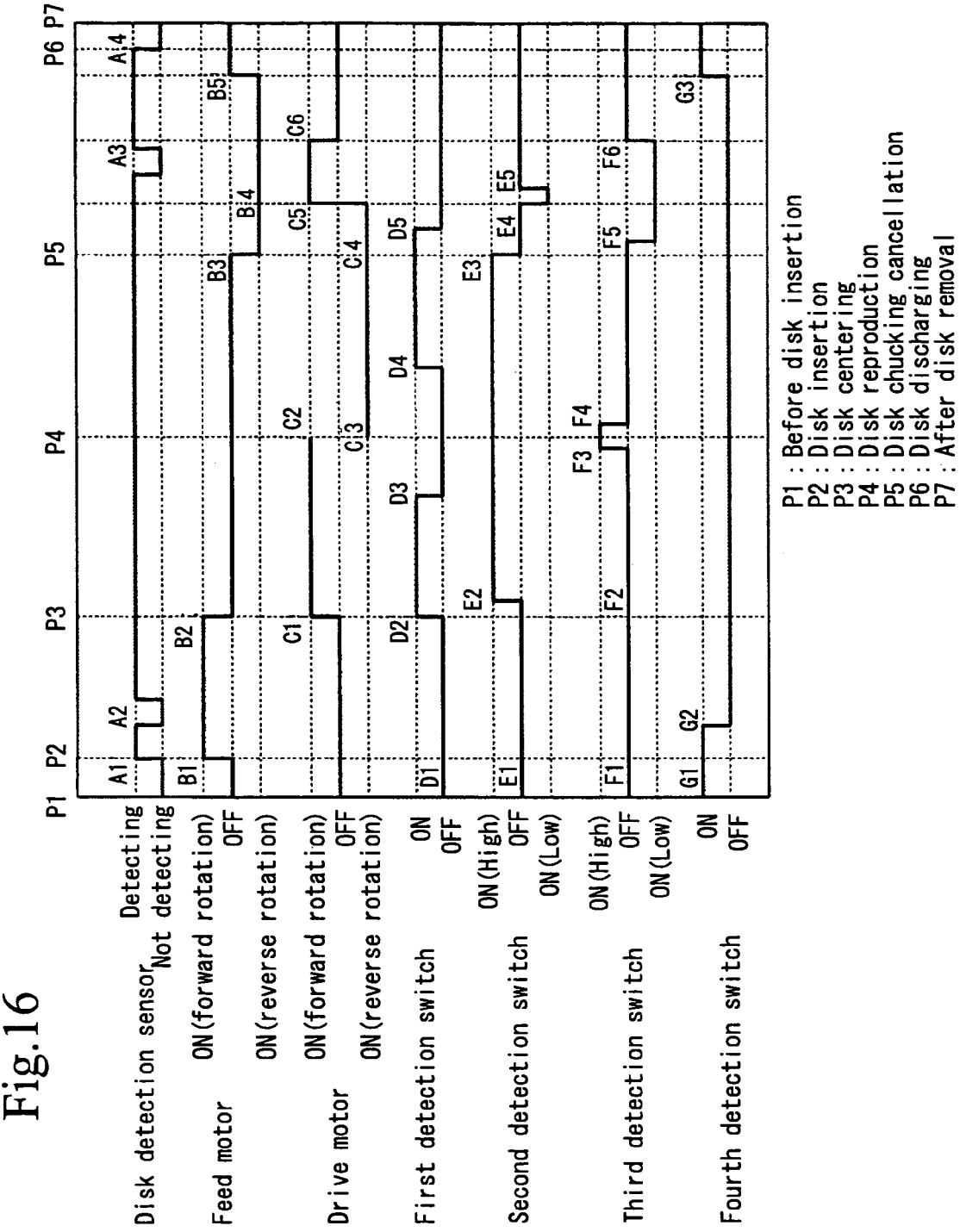
FIG. 16 illustrates operation of the disk reproduction apparatus together with FIGS. 17 to 30 and is a time chart.

In the following, action of the disk reproduction apparatus 1 is described (refer to FIGS. 16 to 30). It is to be noted that FIG. 16 is a time chart illustrating action of the disk reproduction apparatus 1.

Figure 17:
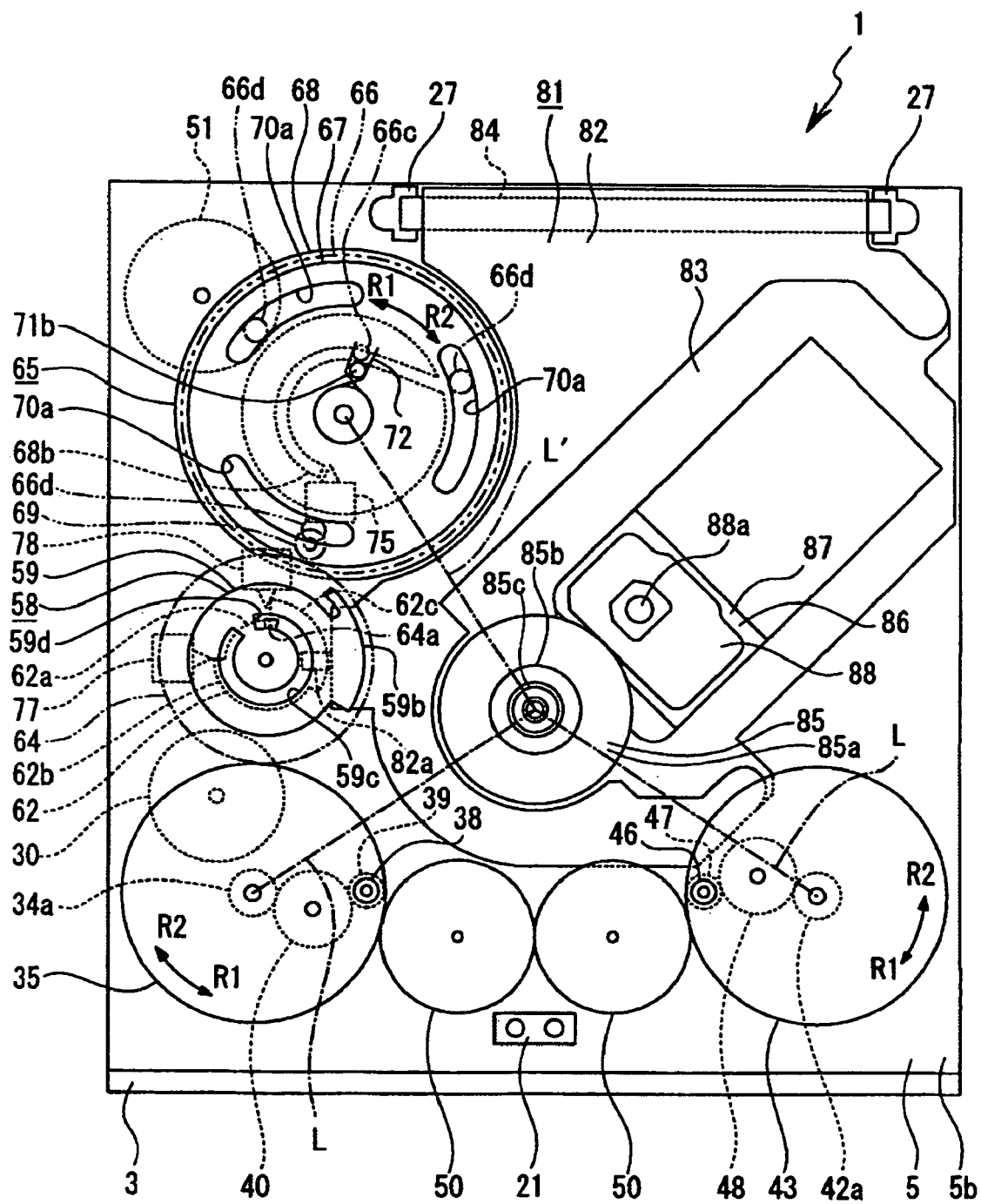
FIG. 17 is a schematic plan view showing several elements in a state before a disk-type recording medium is inserted through a disk slot.
Figure 18:
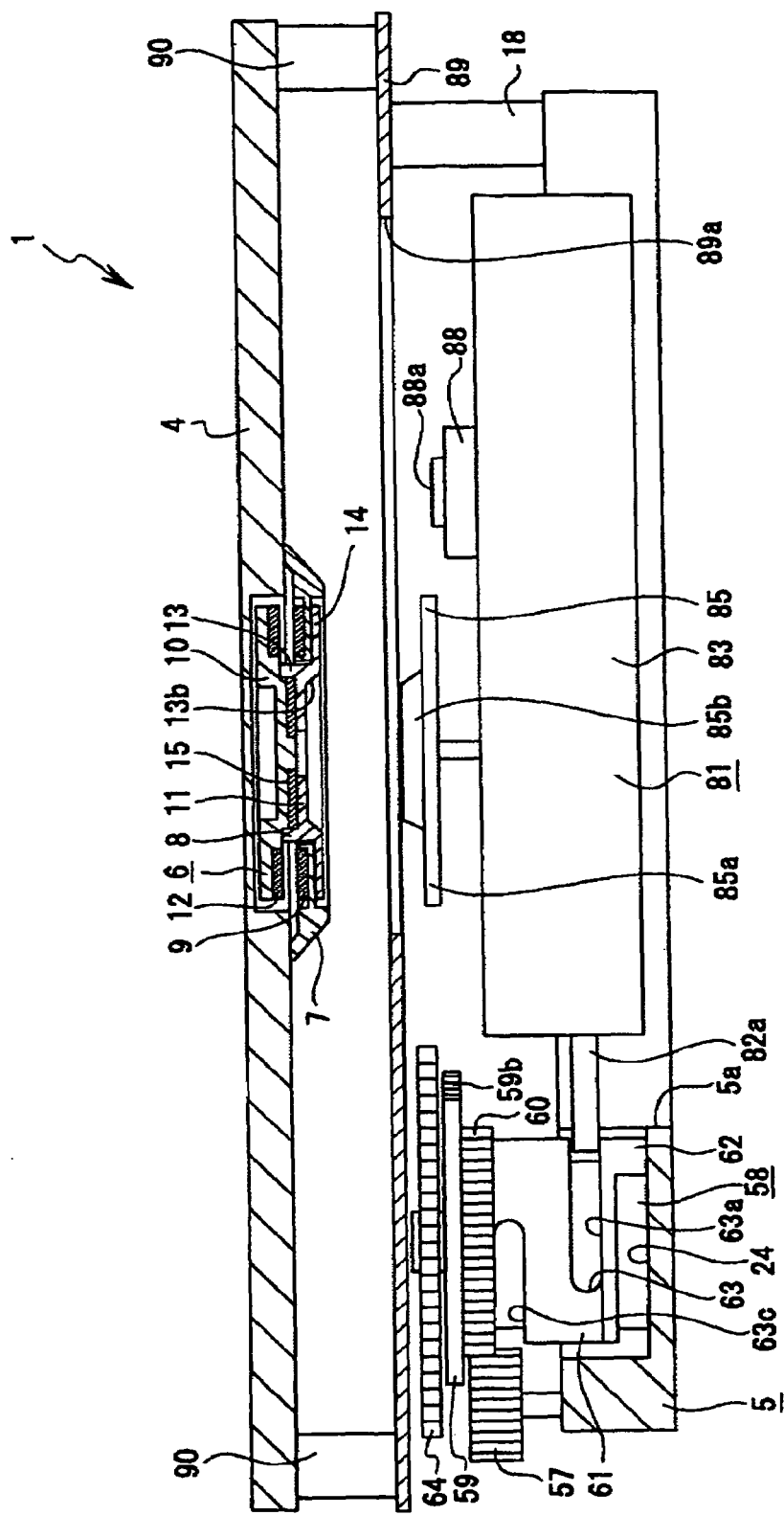
FIG. 18 is a schematic side elevational view showing, partly in section, several elements in a state before a disk-type recording medium is inserted through the disk slot.
Figure 19:
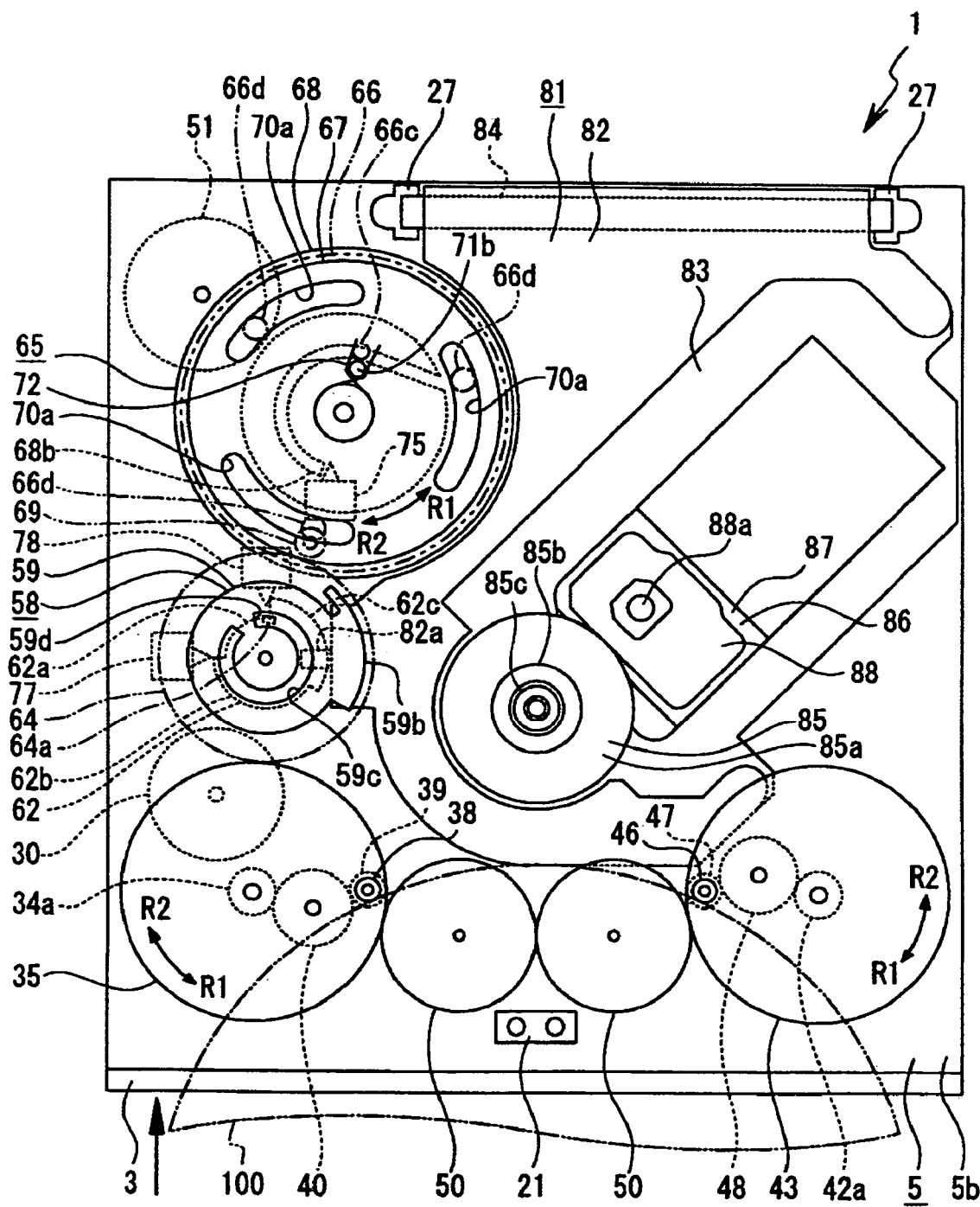
FIG. 19 is a schematic plan view showing several elements in a state immediately after a disk-type recording medium is inserted through the disk slot.

First, states (initial positions) of the individual elements before a disk-type recording medium 100 is inserted into the disk slot 3*a* of the front panel 3 are described (refer to FIGS. 17 and 18). It is to be noted that, with regard to the directions of rotation of the main gears 35 and 43 and the sub gear 65 in the following description, the direction of rotation in which they are biased by the torsion coil springs 37, 45 and 76, respectively, is represented by R2, and the opposite direction of rotation is represented by R1.

The feed roller 38 supported on the main gear 35 and the feed roller 46 supported on the main gear 43 are positioned at the nearest positions to each other. In particular, the feed roller 38 is positioned rightwardly of the center of rotation of the main gear 35 while the feed roller 46 is positioned leftwardly of the center of rotation of the main gear 43 (refer to FIG. 17). At this time, the fourth detection switch 79 disposed on the arrangement projection 19 of the mechanism chassis 5 is operated by the operation projection 49 provided on the lower face of the main gear 43 and is in an ON state (refer to G1 of FIG. 16). The operation projection 49 contacts with the stopper wall 20 projecting from one end edge of the arrangement projection 19 so that rotation of the main gear 43 in the R2 direction is controlled.

The cam gear 58 is not in mesh with the switching gear 68 of the sub gear 65 because the mating gear 59*b* is positioned on the right side of the center of rotation of the cam gear 58 (refer to FIG. 17).

At this time, both of the second detection switch 77 and the third detection switch 78 are positioned in an opposing relationship to the inactive portion 62*a* of the cam gear 58 and remain in an OFF state (refer to E1 and F1 of FIG. 16).

The interlocking gear 64 engages, at the sliding projection 64*a* thereof, with the sliding groove 59*c* of the cam gear 58 at a position rather near to the first wall face 59*d* (refer to FIG. 17).

The control roller 69 supported on the sub gear 65 is positioned at a position displaced a little from a coupling line L' interconnecting the center of rotation of the disk table 85 of the base unit 81 and the center of rotation of the sub gear 65 (refer to FIG. 17). At this time, as described hereinabove, the tip end of the switch pressing projection 68*b* of the switching gear 68 is positioned in the proximity of the operated element of the first detection switch 75, and the first detection switch 75 is in an OFF state (refer to D1 of FIG. 16).

The base unit 81 engages, at the supported pin 82*a* thereof, with the lower cam groove portion 63*a* of the cam gear 58 (refer to FIG. 18). Accordingly, the base unit 81 is held at the lower side movement end, and the disk table 85 is positioned in a most spaced relationship from the chucking pulley 6 positioned above the disk table 85.

The chucking pulley 6 is positioned, at the pulley 8 thereof, at the upper side movement end with respect to the pulley support member 7 by repulsive force between the magnet 9 and the magnet 12, and the stabilizer 11 contacts with the pulley support member 7 from below (refer to FIG. 18).

When a disk-type recording medium 100 is inserted through the disk slot 3*a*, the disk-type recording medium 100 is detected by the disk detection sensor 21 (refer to A1 of FIG. 16). The detection by the disk detection sensor 21 is performed such that detection light emitted from the light emitting element of the disk detection sensor 21 and passing through the passing hole 89*c* of the base plate 89 is reflected by the disk-type recording medium 100, passes through the passing hole 89*c* again and is received by the light receiving element of the disk detection sensor 21.

After the disk-type recording medium 100 is detected by the disk detection sensor 21, the feed motor 30 is rotated (refer to B1 of FIG. 16) and the feed rollers 38 and 46 are rotated in-synchronism with each other. The feed roller 38 is rotated in the counterclockwise direction as viewed in plan while the feed roller 46 is rotated in the clockwise direction as viewed in plan.

After the outer circumferential face of the disk-type recording medium 100 inserted through the disk slot 3a is brought into contact with the feed rollers 38 and 46 (refer to FIG. 19), the disk-type recording medium 100 is fed rearwardly by rotation of the feed rollers 38 and 46. At this time, the feed rollers 38 and 46 roll on the outer circumferential face of the disk-type recording medium 100, and the disk-type recording medium 100 is fed by frictional force acting between the disk-type recording medium 100 and the feed rollers 38 and 46. The outer circumferential face of the disk-type recording medium 100 contacts with the constricted portions 38a and 46a of the feed rollers 38 and 46, and consequently, the disk-type recording medium 100 is fed in a horizontal posture without laterally moving upwardly and downwardly.

As the disk-type recording medium 100 is fed rearwardly by rotation of the feed rollers 38 and 46, the positions at which the feed roller 38 and the feed roller 46 contact with the outer circumferential face of the disk-type recording medium 100 vary every moment as described hereinabove, and therefore, the distance between the feed rollers 38 and 46 varies in accordance with the moved position of the disk-type recording medium 100. Accordingly, the main gear 35 positioned on the left side is rotated in the R1 direction against the biasing force of the torsion coil spring 37 while the main gear 43 positioned on the right side is rotated in the R1 direction against the biasing force of the torsion coil spring 45 (refer to FIG. 20). The main gears 35 and 43 are rotated in synchronism with each other by the synchronous gears 50, 50.

Figure 20:
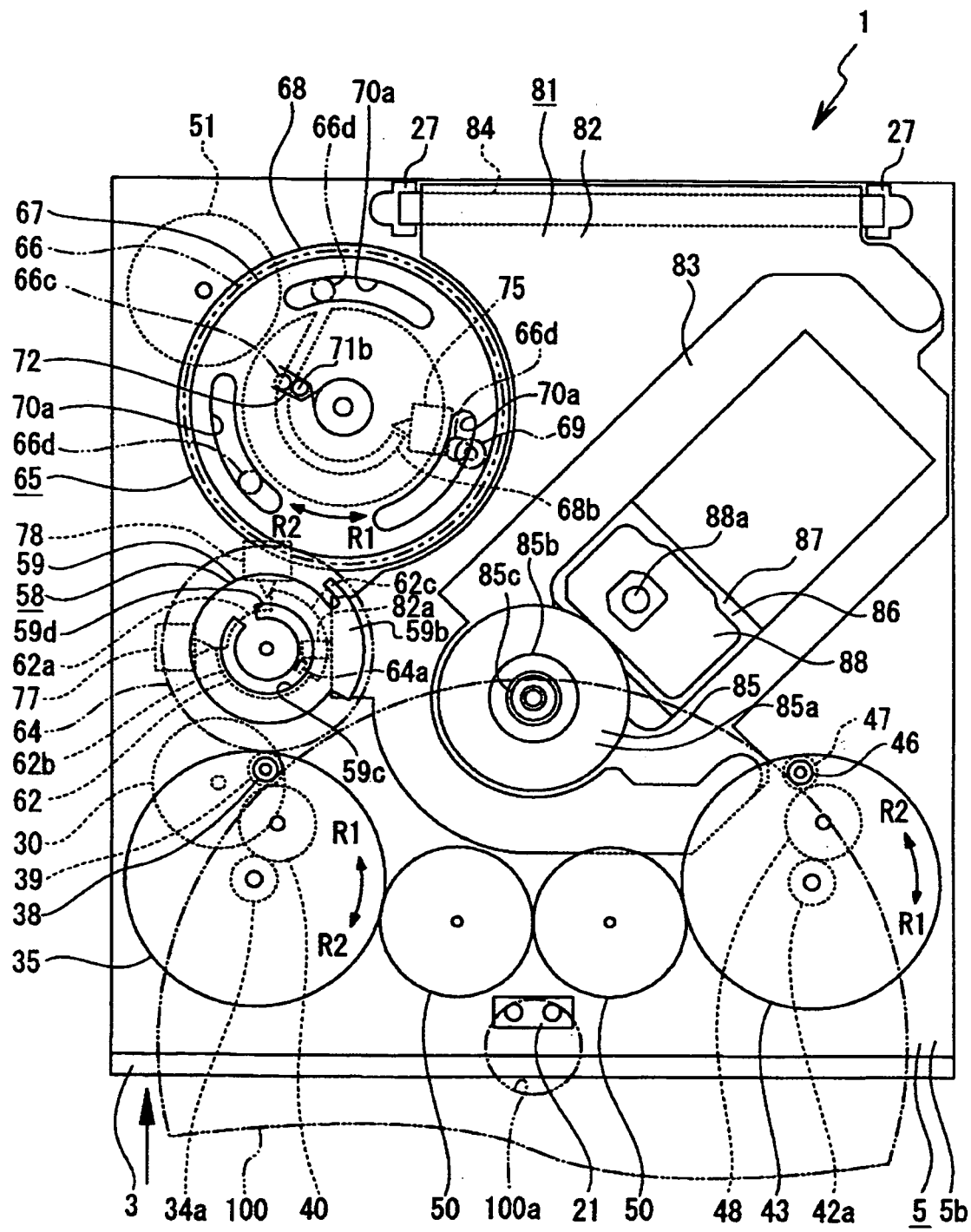
FIG. 20 is a schematic plan view showing the disk-type recording medium in a state wherein it is fed toward a mounting position.
Figure 21:
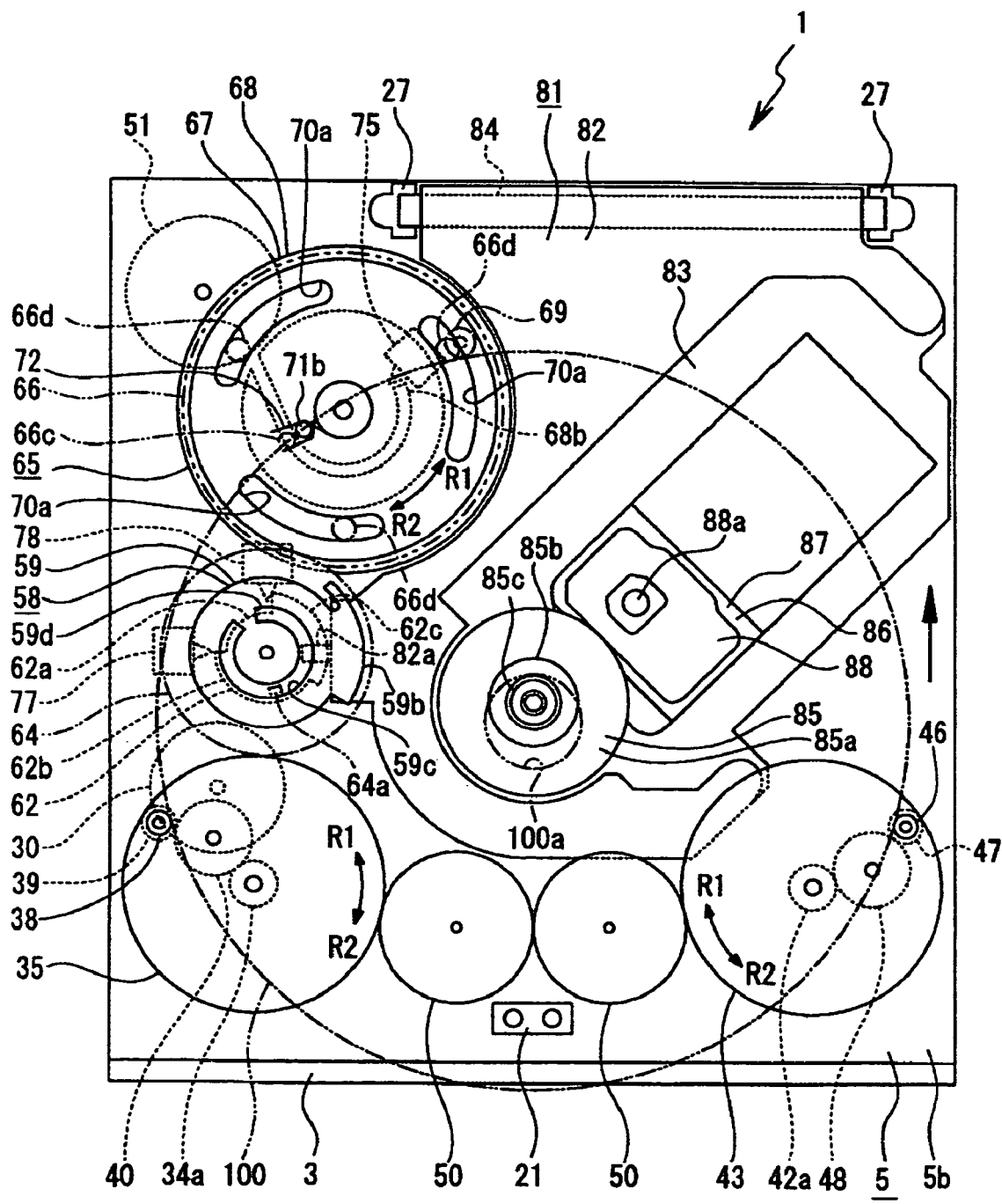
FIG. 21 is a schematic plan view showing the disk-type recording medium in a state wherein it contacts with a control roller.
Figure 22:
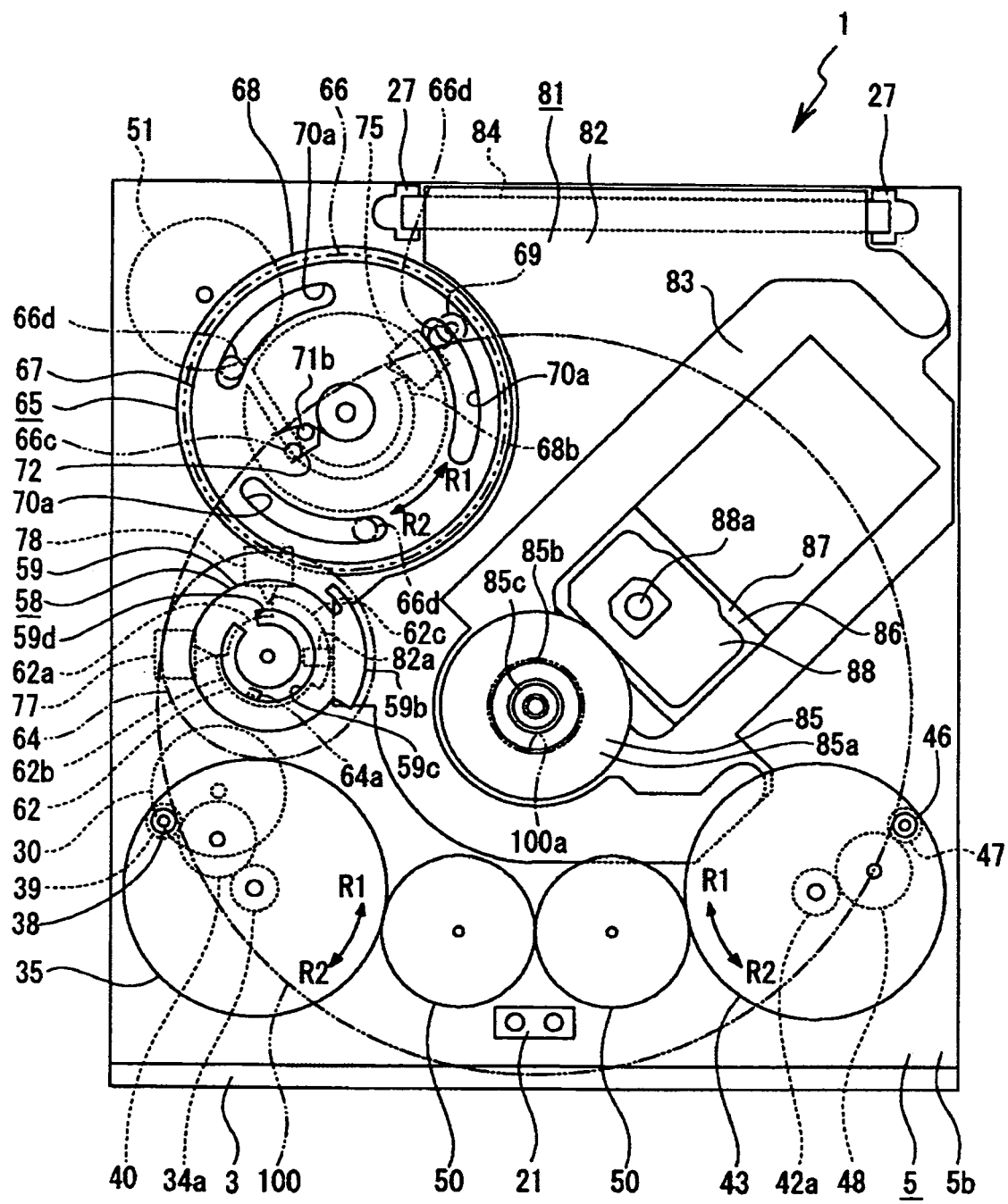
FIG. 22 is a schematic plan view showing a first detection switch in an operated state and the disk-type recording medium in a centered state.

Since the main gears 35 and 43 are rotated in the R1 directions, the feed rollers 38 and 46 are revolved around the centers of rotation of the main gears 35 and 43 while being rotated, respectively (refer to FIG. 20). At this time, the planet gear 40 is revolved around the center of rotation of the intermediate gear 34 while it is in a state wherein it remains in meshing engagement with the sun gear portion 34a of the intermediate gear 34, and the planet gear 48 is revolved around the center of rotation of the intermediate gear 42 while it is in a state wherein it remains in meshing engagement with the sun gear portion 42a of the intermediate gear 42 (refer to FIG. 20).

When the main gear 43 is rotated in the R1 direction, the operation of the fourth detection switch 79 by the operation projection 49 is canceled, and consequently, the fourth detection switch 79 is placed into an OFF state (refer to G2 of FIG. 16).

When the disk-type recording medium 100 is fed rearwardly and a center hole 100a thereof passes above the disk detection sensor 21, the detection of the disk-type recording medium 100 by the disk detection sensor 21 is not performed temporarily (refer to A2 of FIG. 16).

When the main gears 35 and 43 are rotated in the R1 direction in synchronism with each other, since also the sub gear 65 is rotated in the R1 direction in synchronism, the control roller 69 supported on the sub gear 65 is revolved around the center of rotation of the sub gear 65 (refer to FIG. 20).

As the disk-type recording medium 100 is further fed rearwardly from the state wherein the center of the disk-type recording medium 100 fed rearwardly is positioned on the line which interconnects the feed rollers 38 and 46, the main gears 35 and 43 are reversed by the biasing force of the torsion coil springs 37 and 45 and rotated both in the R2 directions. When the center of the disk-type recording medium 100 is positioned rather on the front side than the center of the disk table 85 of the base unit 81, the outer circumferential face of the disk-type recording medium 100 is in contact with the control roller 69 of the sub gear 65 (refer to FIG. 21).

As the disk-type recording medium 100 is further fed rearwardly from this state, since the main gears 35 and 43 are individually rotated a little in the R2 directions, also the sub gear 65 which is rotated in synchronism tends to rotate in the R2 direction. However, since the control roller 69 supported on the circular plate portion 66 is pressed substantially rearwardly by the outer circumferential face of the disk-type recording medium 100 fed rearwardly by rotation of the feed rollers 38 and 46, while the limiter gear 67 is rotated in the R2 direction, the circular plate portion 66 and the switching gear 68 mounted on the circular plate portion 66 are rotated in the R1 directions against the biasing force of the limiter spring 72. Accordingly, the first detection switch 75 is operated into an ON state by the switch pressing projection 68b of the switching gear 68 (refer to D2 of FIG. 16 and to FIG. 22), rotation of the feed motor 30 is stopped and rotation of the drive motor 51 is started (refer to B2 and C1 of FIG. 16).

When the rotation of the feed motor 30 is stopped, the rotation of the feed rollers 38 and 46 is stopped and the feeding action of the disk-type recording medium 100 is stopped. At this time, the center hole 100a of the disk-type recording medium 100 is positioned just above the centering projection 85b of the disk table 85 and the disk-type recording medium 100 is centered with respect to the disk table 85 thereby to come to the mounting position at which the disk-type recording medium 100 is to be mounted onto the disk table 85 (refer to FIG. 22). Since the rotation of the feed motor 30 is stopped and the disk-type recording medium 100 is stopped at the mounting position and centered in response to an operation of the first detection switch 75 in this manner, the first detection switch 75 plays a roll as a detection switch for detecting arrival of the disk-type recording medium 100 at the mounting position.

Since the main gears 35 and 43 and the sub gear 65 are biased in the respective R2 directions by the torsion coil springs 37, 45 and 76, respectively, the constricted portions 38a, 46a and 69a of the feed rollers 38 and 46 and the control roller 69 are pressed against the outer circumferential face of the disk-type recording medium 100.

When the first detection switch 75 is placed into an ON state and the drive motor 51 is rotated in such a manner as described above, the cam gear 58 is rotated in the clockwise direction as viewed in plan, whereupon the second detection switch 77 is operated into an ON (High) state by the active portion 62c of the switching portion 62 of the cam gear 58 (refer to E2 of FIG. 16). When the second detection switch 77 is operated, since the intermediate active portion 62b of the switching portion 62 is kept positioned in an opposing relationship to the third detection switch 78, the third detection switch 78 still remains in an OFF state (refer to F2 of FIG. 16).

Figure 23:
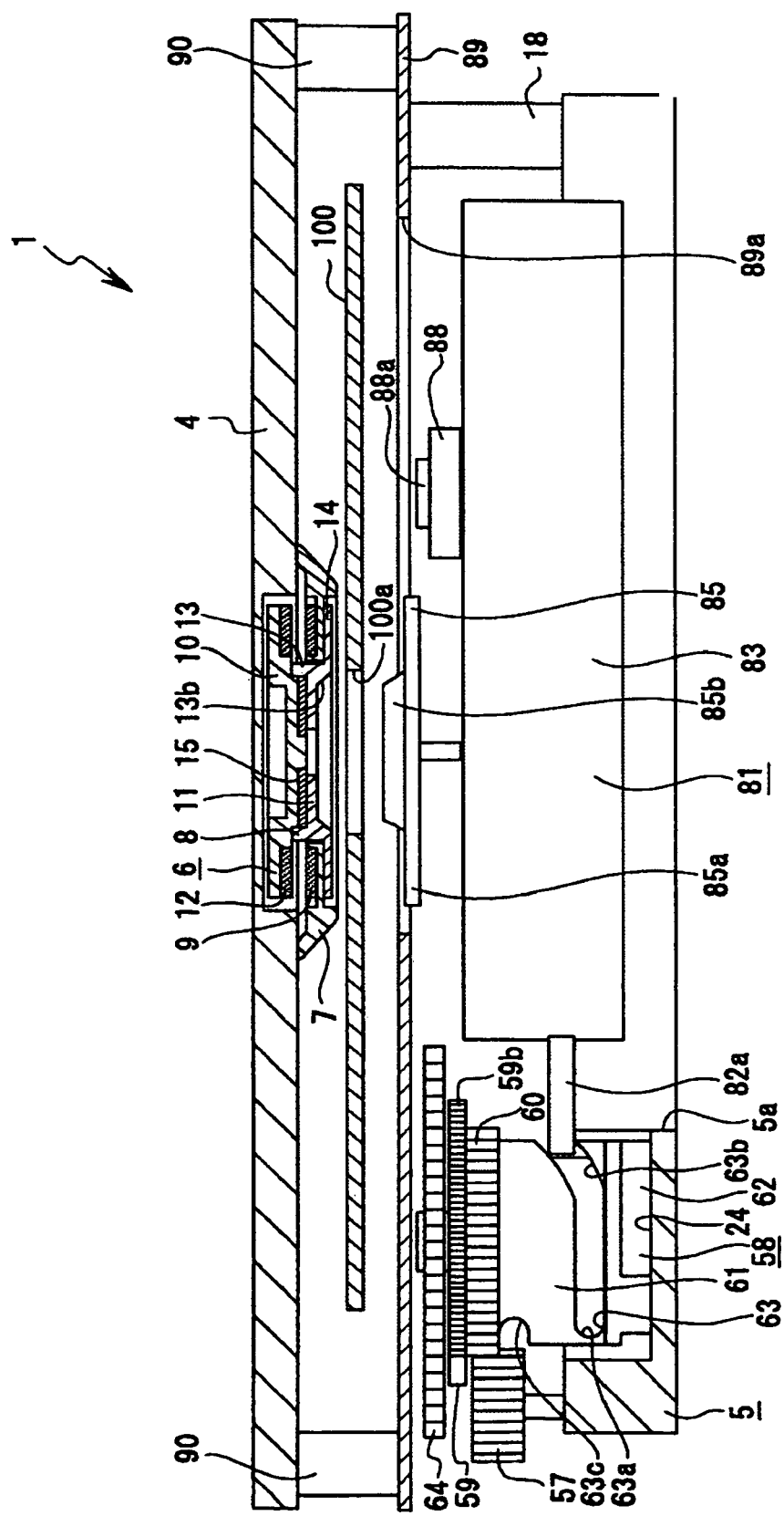
FIG. 23 is a schematic side elevational view showing, partly in section, a base unit in an intermediate state while it is being moved.

When the cam gear 58 is further rotated by the rotation of the drive motor 51 as described above, the supported pin 82a of the base unit 81 is relatively moved from the lower cam groove portion 63a into the inclined cam groove portion 63b of the cam gear 58, and consequently, the base unit 81 is pivoted around the supported shaft 84 in a direction in which the disk table 85 moves upwardly (refer to FIG. 23).

Figure 24:
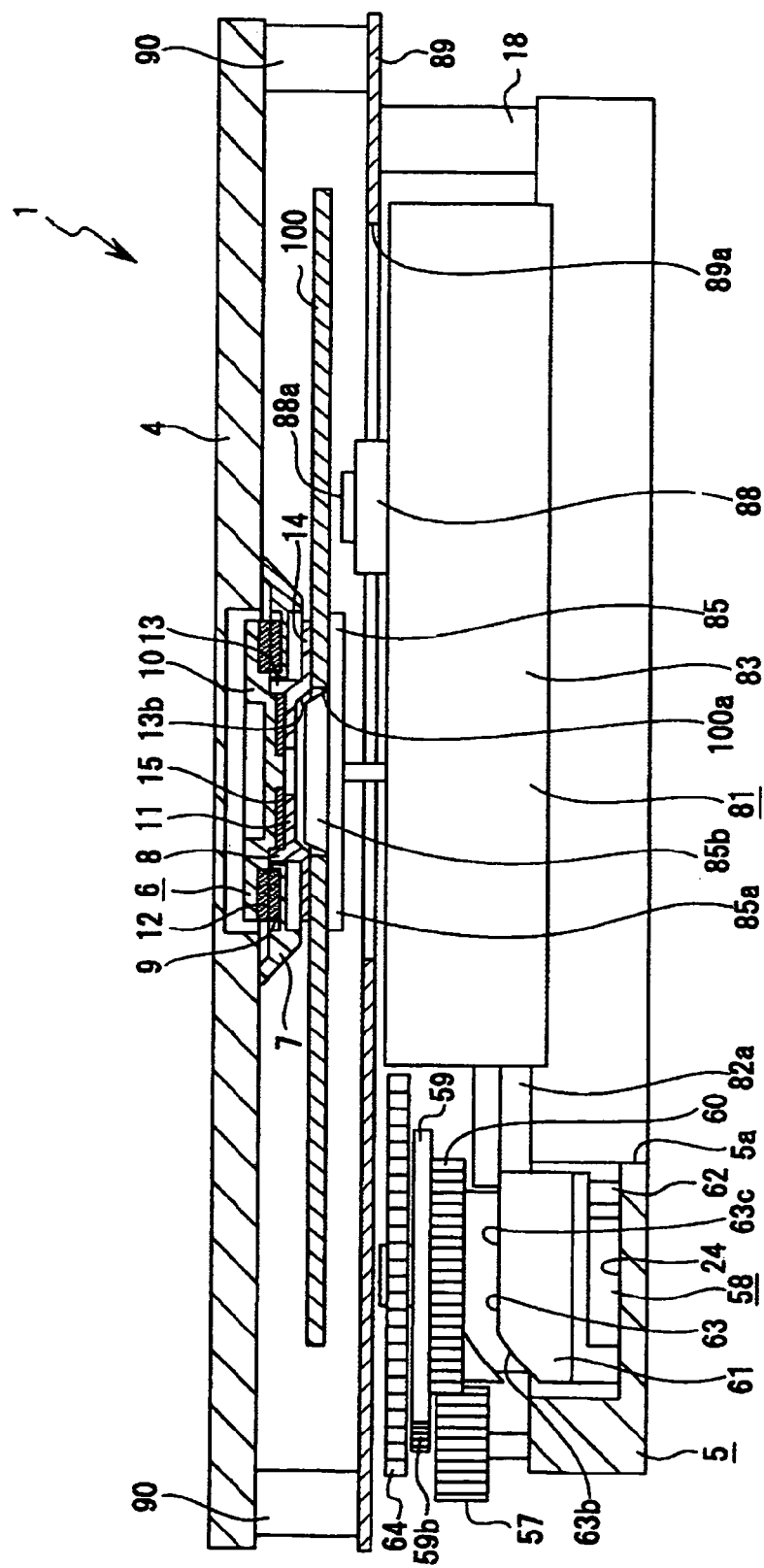
FIG. 24 is a schematic side elevational view showing, partly in section, the base unit in a state wherein it is moved to a movement end on the upper side.
Figure 25:
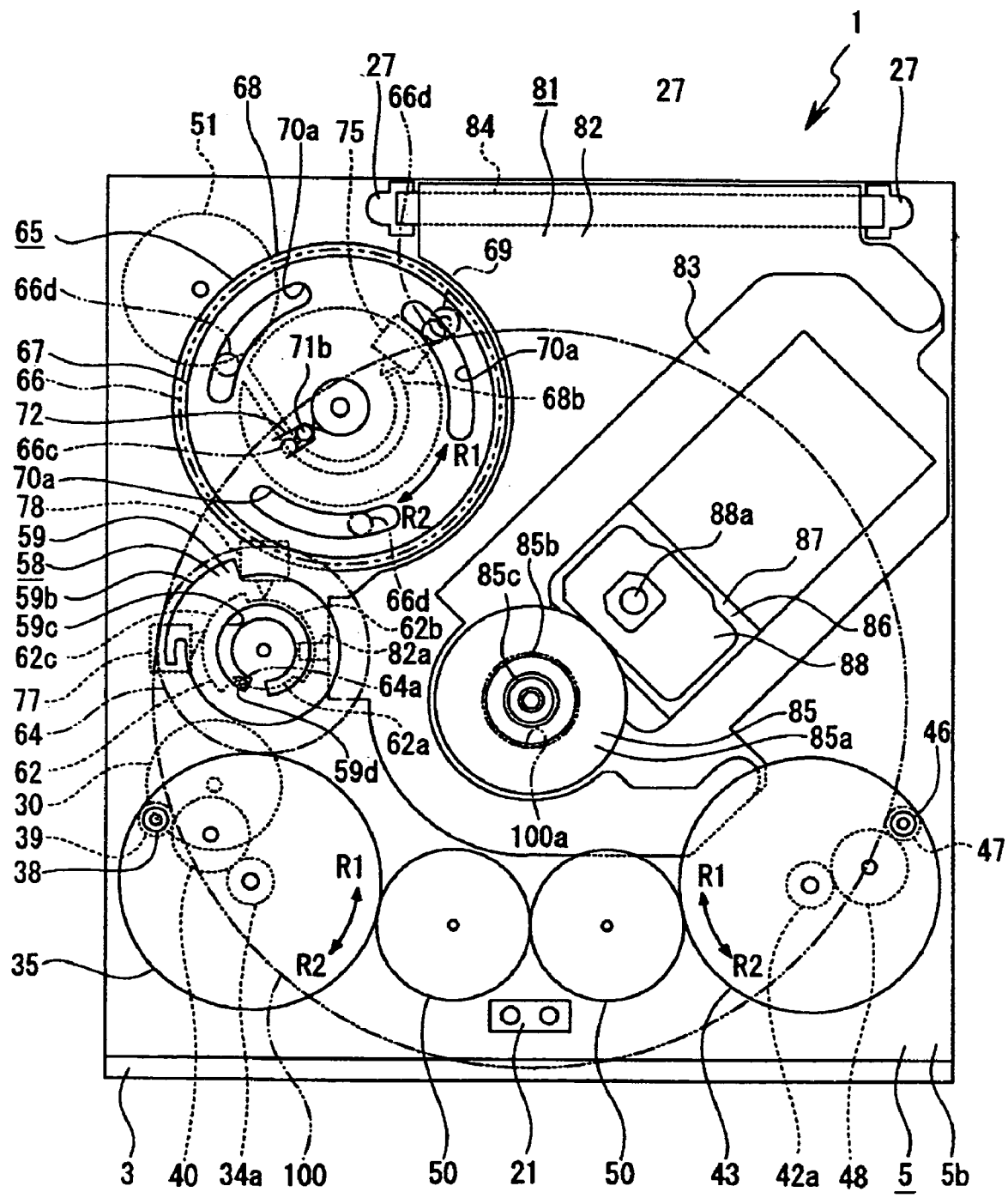
FIG. 25 is a schematic plan view showing the first detection switch in a state wherein operation thereof is canceled.

As the cam gear 58 is further rotated by the rotation of the drive motor 51, the supported pin 82a of the base unit 81 is relatively moved from the inclined cam groove portion 63b into the upper cam groove portion 63c of the cam gear 58, the base unit 81 is pivoted around the supported shaft 84 in the direction in which the disk table 85 further moves upwardly (refer to FIG. 24).

When the supported pin 82a comes to the upper cam groove portion 63c, the disk table 85 is fitted into the arrangement hole 89a of the base plate 89 and the centering projection 85b is inserted from below into the center hole 100a of the disk-type recording medium 100 which is positioned at the mounting position (refer to FIG. 24). At this time, the metal plate 15 mounted on the stabilizer 11 of the chucking pulley 6 is attracted downwardly by the magnet 85c embedded in the centering projection 85b. Accordingly, the inner circumferential edge portion of the disk-type recording medium 100 is sandwiched between the table portion 85a of the disk table 85 and the sandwiching portion 14 of the stabilizer 11 thereby to chuck the disk-type recording medium 100 (refer to FIG. 24).

Substantially simultaneously when the disk-type recording medium 100 is chucked by the disk table 85 and the stabilizer 11, the sliding projection 64a of the interlocking gear 64 is pressed by the first wall face 59d of the cam gear 58 being rotated to rotate the interlocking gear 64 in the clockwise direction as viewed in plan.

When the interlocking gear 64 is rotated in the clockwise direction as viewed in plan, the limiter gear 67 held in meshing engagement with the interlocking gear 64 is rotated in the R1 direction, whereupon the circular plate portion 66 and the switching gear 68 are rotated in the respective R2 directions relative to the limiter gear 67 by the biasing force of the limiter spring 72. Accordingly, the switch pressing projection 68b of the switching gear 68 is spaced away from the first detection switch 75, and the first detection switch 75 is placed into an OFF state (refer to D3 of FIG. 16 and to FIG. 25).

Simultaneously, when the interlocking gear 64 is rotated in the clockwise direction as viewed in plan, the main gear 35 held in meshing engagement with the interlocking gear 64 is rotated in the R1 direction in synchronism with the main gear 35, and simultaneously, also the main gear 43 is rotated in synchronism in the R1 direction. Accordingly, the feed rollers 38 and 46 are revolved around the centers of rotation of the main gears 35 and 43 and spaced away from the outer circumferential face of the disk-type recording medium 100 (refer to FIG. 25).

Figure 26:
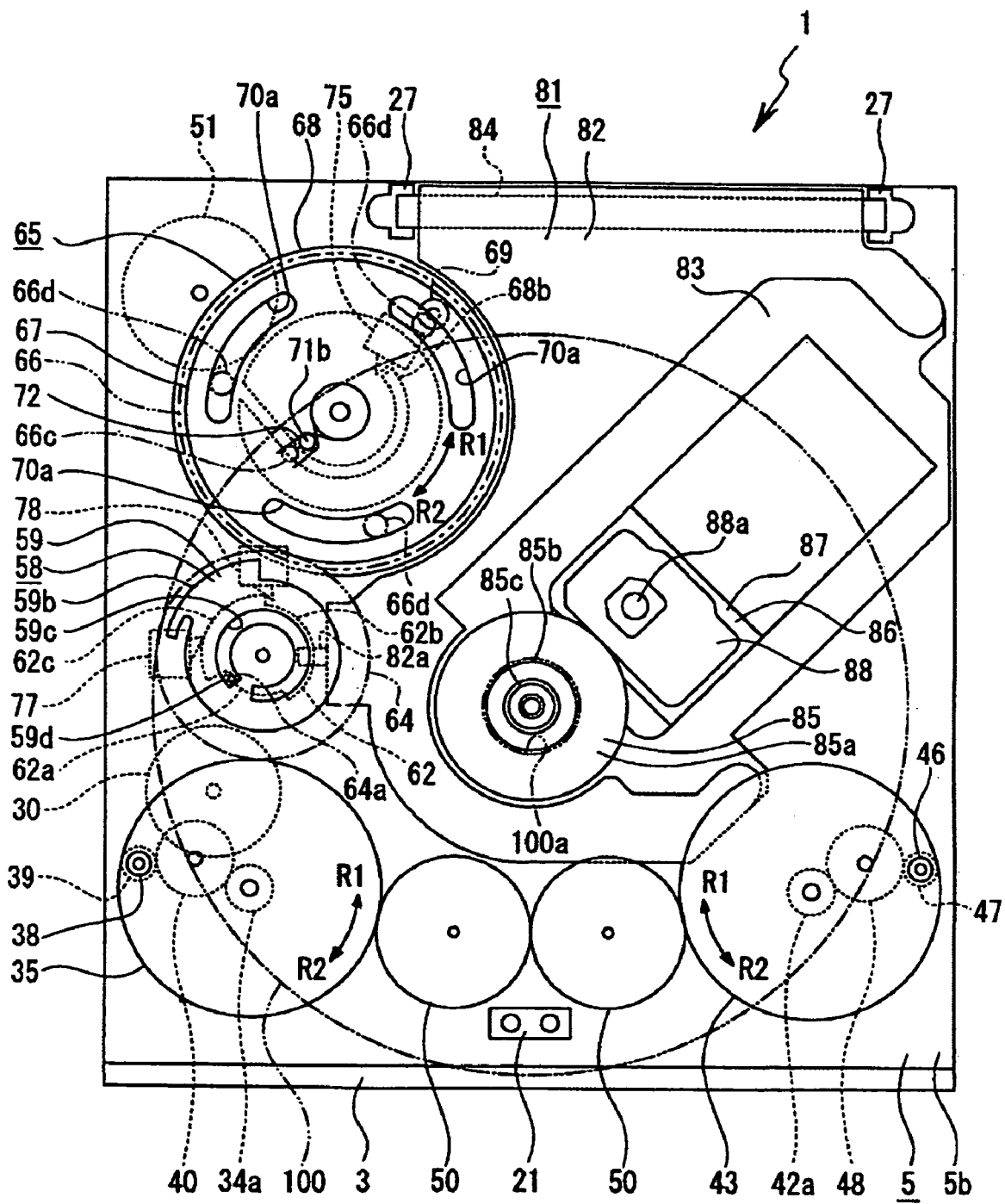
FIG. 26 is a schematic plan view showing a feed roller and the control roller in a state wherein they are spaced away from the disk-type recording medium.

The sub gear 65 and the main gears 35 and 43 are rotated in the respective R1 directions by the rotation of the interlocking gear 64, and the control roller 69 and the feed rollers 38 and 46 are all spaced away from the outer circumferential face of the disk-type recording medium 100 (refer to FIG. 26). Accordingly, the disk-type recording medium 100 is placed into a state in which it can rotate smoothly without slidably contacting with the control roller 69 and the feed rollers 38 and 46.

When the cam gear 58 is rotated to a predetermined position, the third detection switch 78 is operated into an ON (High) state by the active portion 62c of the cam gear 58 (refer to F3 of FIG. 16). At this time, the second detection switch 77 is operated into an ON (High) state by the intermediate active portion 62b and both of the second detection switch 77 and the third detection switch 78 are placed into an ON (High) state, and consequently, the rotation of the drive motor 51 is stopped (refer to C2 of FIG. 16). Accordingly, the rotation of the cam gear 58 is stopped and also the rotation of the main gears 35 and 43 and the sub gear 65 is stopped. In the state wherein the rotation of the cam gear 58 is stopped, the mating gear 59b is not in meshing engagement with the switching gear 68 of the sub gear 65 (refer to FIG. 26).

After the rotation of the drive motor 51 is stopped, the spindle motor of the base unit 81 is rotated, and as the disk table 85 rotates, the disk-type recording medium 100 is rotated and the optical pickup 86 is moved in a radial direction of the disk-type recording medium 100, whereupon a laser beam is illuminated upon the recording face of the disk-type recording medium 100 through the objective lens 88a of the two-axis actuator 88 to effect reproduction of an information signal recorded on the disk-type recording medium 100.

After the reproduction action for the disk-type recording medium 100 comes to an end, the drive motor 51 is rotated again (refer to C3 of FIG. 16). The drive motor 51 is rotated in the opposite direction to that described above.

When the drive motor 51 is rotated, the cam gear 58 is rotated in the counterclockwise direction as viewed in plan, and the operation of the third detection switch 78 by the active portion 62c of the cam gear 58 is canceled and the third detection switch 78 is placed into an OFF state (refer to F4 of FIG. 16). At this time, since the second detection switch 77 remains operated by the intermediate active portion 62b of the cam gear 58, it remains in the ON (High) state.

As the cam gear 58 is rotated in the counterclockwise direction as viewed in plan by the rotation of the drive motor 51, the supported pin 82a of the base unit 81 is relatively moved from the upper cam groove portion 63c into the lower cam groove portion 63a through the inclined cam groove portion 63b of the cam gear 58, whereupon the base unit 81 is pivoted around the supported shaft 84 in a direction in which the disk table 85 moves downwardly. Accordingly, the disk table 85 is spaced downwardly away from the disk-type recording medium 100 and the chucking of the disk-type recording medium 100 by the table portion 85a of the disk table 85 and the sandwiching portion 14 of the stabilizer 11 is canceled. In the state wherein the chucking is canceled, the chucking pulley 6 is acted upon by reactive force from the magnet 9 and the magnet 12 so that the pulley 8 is moved to the upper side movement end again until the stabilizer 11 is brought into contact from below with the pulley support member 7 (refer to FIG. 18).

When the drive motor 51 is rotated and the cam gear 58 is rotated in the counterclockwise direction as viewed in plan, since the first wall face 59d of the cam gear 58 is moved in a direction in which it is spaced away from the sliding projection 64a of the interlocking gear 64, the sub gear 65 and the main gears 35 and 43 are rotated in the respective R2 directions by the biasing force of the torsion coil springs 37, 45 and 76, respectively. Accordingly, the control roller 69 and the feed rollers 38 and 46 are revolved around the centers of rotation of the sub gear 65 and main gears 35 and 43, respectively, in a direction in which they approach the outer circumferential face of the disk-type recording medium 100 until they contact with the outer circumferential face of the disk-type recording medium 100 in the state wherein the disk-type recording medium 100 is released from the chucking so that the disk-type recording medium 100 is held in a horizontal posture (refer to FIG. 27).

When the control roller 69 is placed into contact with and pressed against the outer circumferential face of the disk-type recording medium 100 by the biasing force of the torsion coil spring 76, the control roller 69 is acted upon by reactive force from the disk-type recording medium 100 in a direction in which the control roller 69 is spaced away from the outer circumferential face of the disk-type recording medium 100. Accordingly, the circular plate portion 66 and the switching gear 68 of the sub gear 65 are rotated in the R1 direction with respect to the limiter gear 67 against the biasing force of the limiter spring 72, whereupon the first detection switch 75 is placed into an ON state (refer to D4 of FIG. 16 and to FIG. 27).

Figure 27:
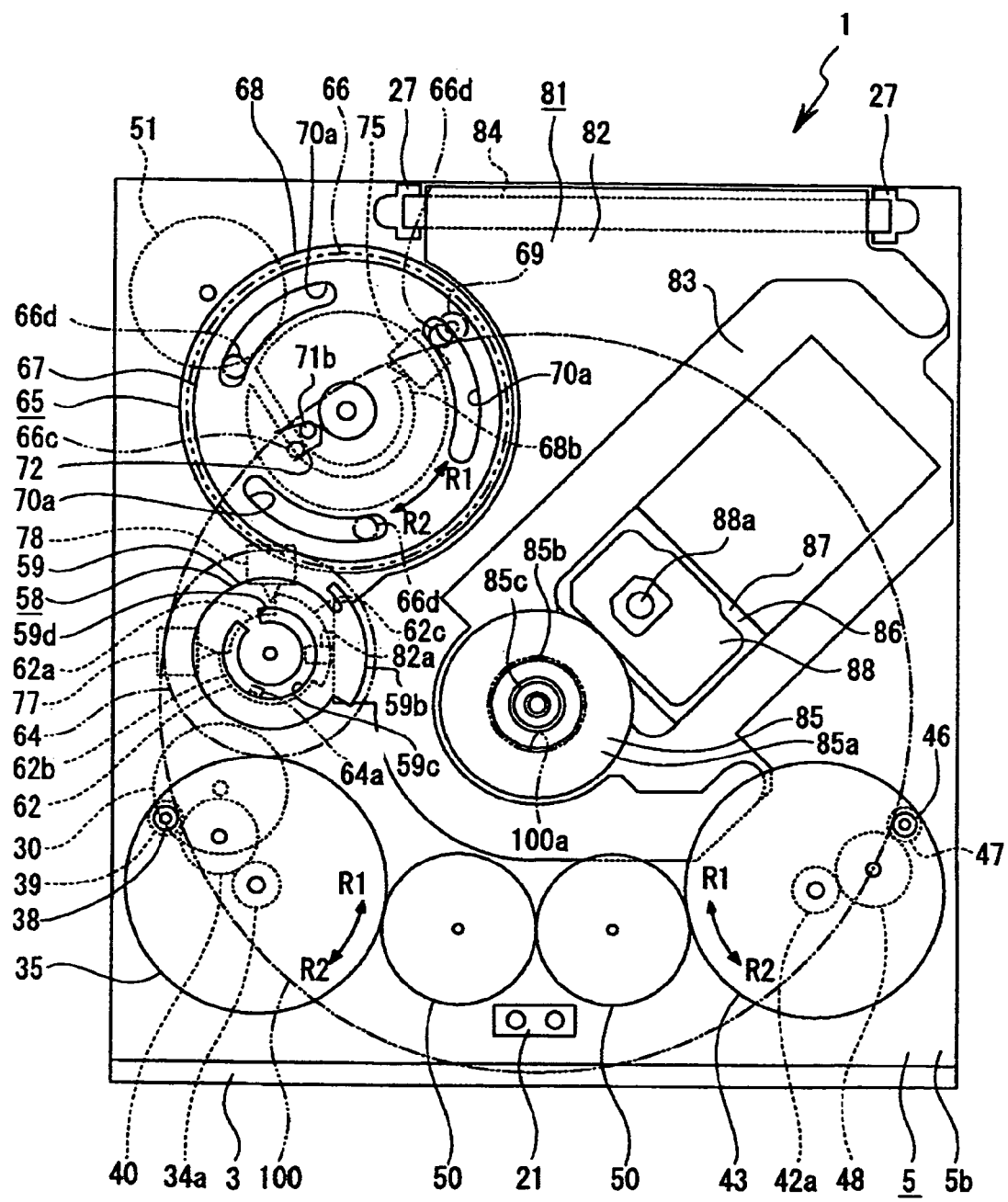
FIG. 27 is a schematic plan view showing the feed roller and the regulation roller in a state wherein they are brought into contact with the disk-type recording medium again to hold the disk-type recording medium.

When the chucking of the disk-type recording medium 100 is released, the inactive portion 62a of the cam gear 58 is positioned in an opposing relationship to the second detection switch 77 as a result of the rotation of the cam gear 58 in the counterclockwise direction and the operation for the second detection switch 77 is canceled so that the second detection switch 77 is placed into an OFF state (refer to E3 of FIG. 16 and to FIG. 27). At this time, the cam gear 58 is rotated to its initial position.

Also after the chucking of the disk-type recording medium 100 is completed and the base unit 81 is pivoted to the lower side movement end in such a manner as described above, the drive motor 51 is rotated continuously (refer to C4 of FIG. 16).

In the state wherein the chucking of the disk-type recording medium 100 is canceled and the base unit 81 is pivoted to the lower side movement end, rotation of the feed motor 30 in a direction opposite to that of the former rotation is started (refer to B3 of FIG. 16). As the feed motor 30 is rotated, the disk-type recording medium 100 is fed forwardly by rotation of the feed rollers 38 and 46 which are in contact with the outer circumferential face of the disk-type recording medium 100 (refer to FIG. 28). At this time, the feed rollers 38 and 46 roll on the outer circumferential face of the disk-type recording medium 100, and the disk-type recording medium 100 is fed by frictional force thereof with the feed rollers 38 and 46. The outer circumferential face of the disk-type recording medium 100 is in contact with the constricted portions 38a and 46a of the feed rollers 38 and 46, and consequently, the disk-type recording medium 100 is fed in a horizontal posture without being laterally moved upwardly and downwardly.

Since the drive motor 51 is rotated continuously in such a manner as described above, also after the cam gear 58 arrives at its initial position, it is further rotated in the counterclockwise direction as viewed in plan until the third detection switch 78 is operated by the active portion 62c of the cam gear 58 so that the third detection switch 78 is placed into an ON (Low) state (refer to F5 of FIG. 16).

As the disk-type recording medium 100 is fed by the rotation of the feed rollers 38 and 46, since the positions of the feed roller 38 and the feed roller 46 at which they contact with the outer circumferential face of the disk-type recording medium 100 vary every moment as described above, the distance between the feed rollers 38 and 46 varies in accordance with the moved position of the disk-type recording medium 100. Accordingly, the main gear 35 positioned on the left side is rotated in the R2 direction by the biasing force of the torsion coil spring 37 while the main gear 43 positioned on the right side is rotated in the R2 direction by the biasing force of the torsion coil spring 45 (refer to FIG. 28). The main gears 35 and 43 are rotated in synchronism with each other by the synchronous gears 50, 50.

Figure 28:
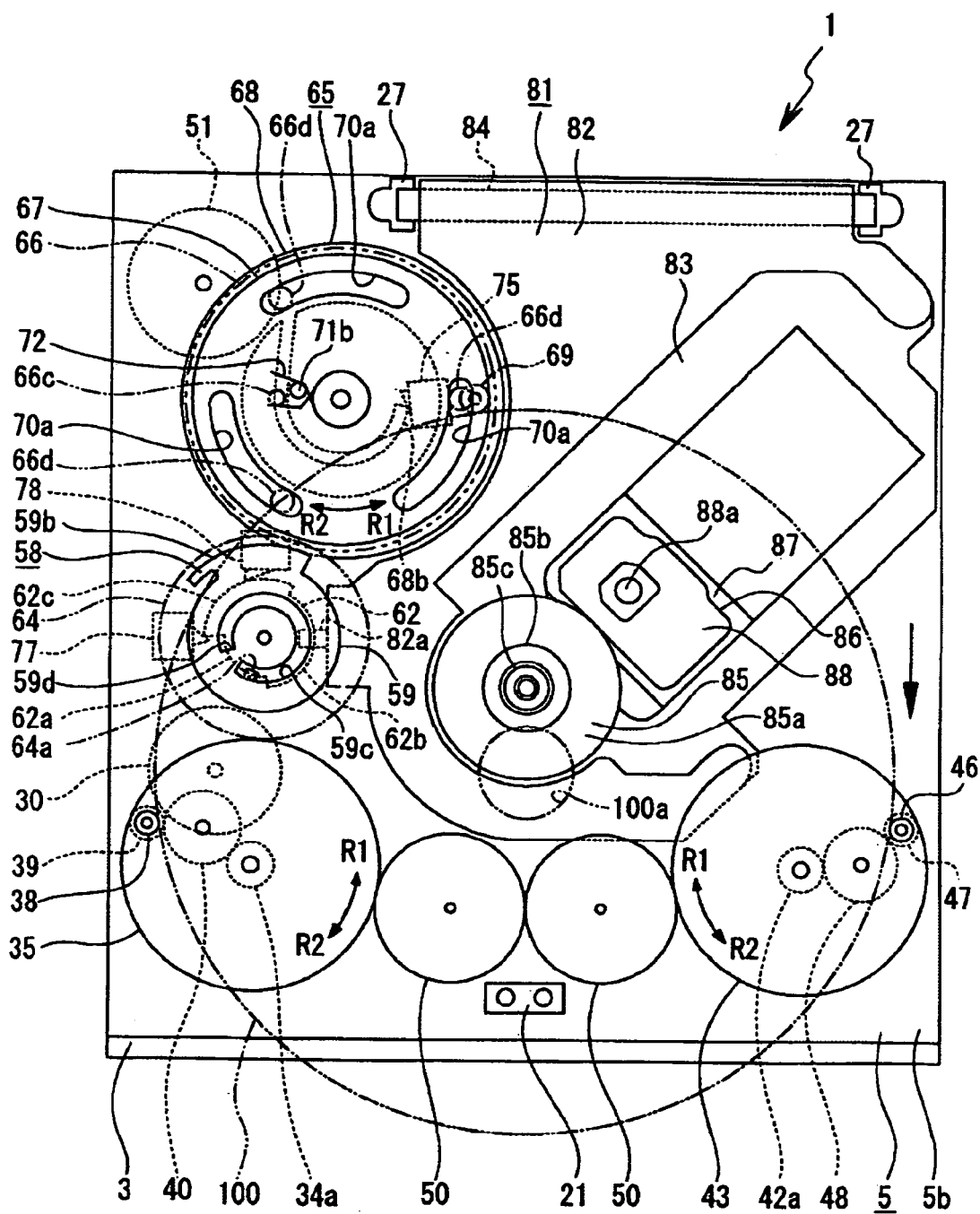
FIG. 28 is a schematic plan view showing the disk-type recording medium in a state wherein it is pressed in a discharging direction by the control roller.

Since the main gears 35 and 43 are rotated in the R2 directions, the feed rollers 38 and 46 are revolved around the centers of rotation of the main gears 35 and 43 while rotating themselves (refer to FIG. 28). At this time, the planet gear 40 is revolved around the center of rotation of the intermediate gear 34 in a state wherein it is in meshing engagement with the sun gear portion 34a of the intermediate gear 34 while the planet gear 48 is revolved around the center of rotation of the intermediate gear 42 in a state wherein it is in meshing engagement with the sun gear portion 42a of the intermediate gear 42 (refer to FIG. 28).

When the disk-type recording medium 100 is fed forwardly, the mating gear 59b is brought into meshing engagement with the switching gear 68 by rotation of the cam gear 58 in the counterclockwise direction as viewed in plan (refer to FIG. 28). Accordingly, the sub gear 65 is rotated in the R2 direction, and the outer circumferential face of the disk-type recording medium 100 is pressed substantially forwardly by the control roller 69.

In this manner, in the disk reproduction apparatus 1, since the control roller 69 presses the disk-type recording medium 100 forwardly by rotation of the sub gear 65 when the disk-type recording medium 100 is fed forwardly by rotation of the feed rollers 38 and 46, the disk-type recording medium 100 can be fed forwardly with certainty and discharging of the disk-type recording medium 100 from the disk slot 3a can be performed with certainty.

When the disk-type recording medium 100 is fed forwardly to a predetermined position when the sub gear 65 is rotated in the R2 direction, since the reactive force from the disk-type recording medium 100 to the control roller 69 decreases when the disk-type recording medium 100 is spaced forwardly away from the control roller 69, the circular plate portion 66 and the switching gear 68 are rotated in the R2 direction with respect to the limiter gear 67 by the biasing force of the limiter spring 72 and the switch pressing projection 68b of the switching gear 68 is spaced away from the first detection switch 75 to place the first detection switch 75 into an OFF state (refer to D5 of FIG. 16).

When the cam gear 58 is rotated to a predetermined position in the counterclockwise direction as viewed in plan, the second detection switch 77 is operated by the active portion 58a of the cam gear 58 to place the second detection switch 77 into an ON (Low) state (refer to E4 of FIG. 16). At this time, the third detection switch 78 is operated by the active portion 62c into an ON (Low state), and since both of the second detection switch 77 and the third detection switch 78 are in an ON (Low) state, the drive motor 51 is reversed (refer to C5 of FIG. 16). When the drive motor 51 is reversed, the feed motor 30 still continues to rotate (refer to B4 of FIG. 16) and the disk-type recording medium 100 continues to be fed forwardly by rotation of the feed rollers 38 and 46.

Figure 29:
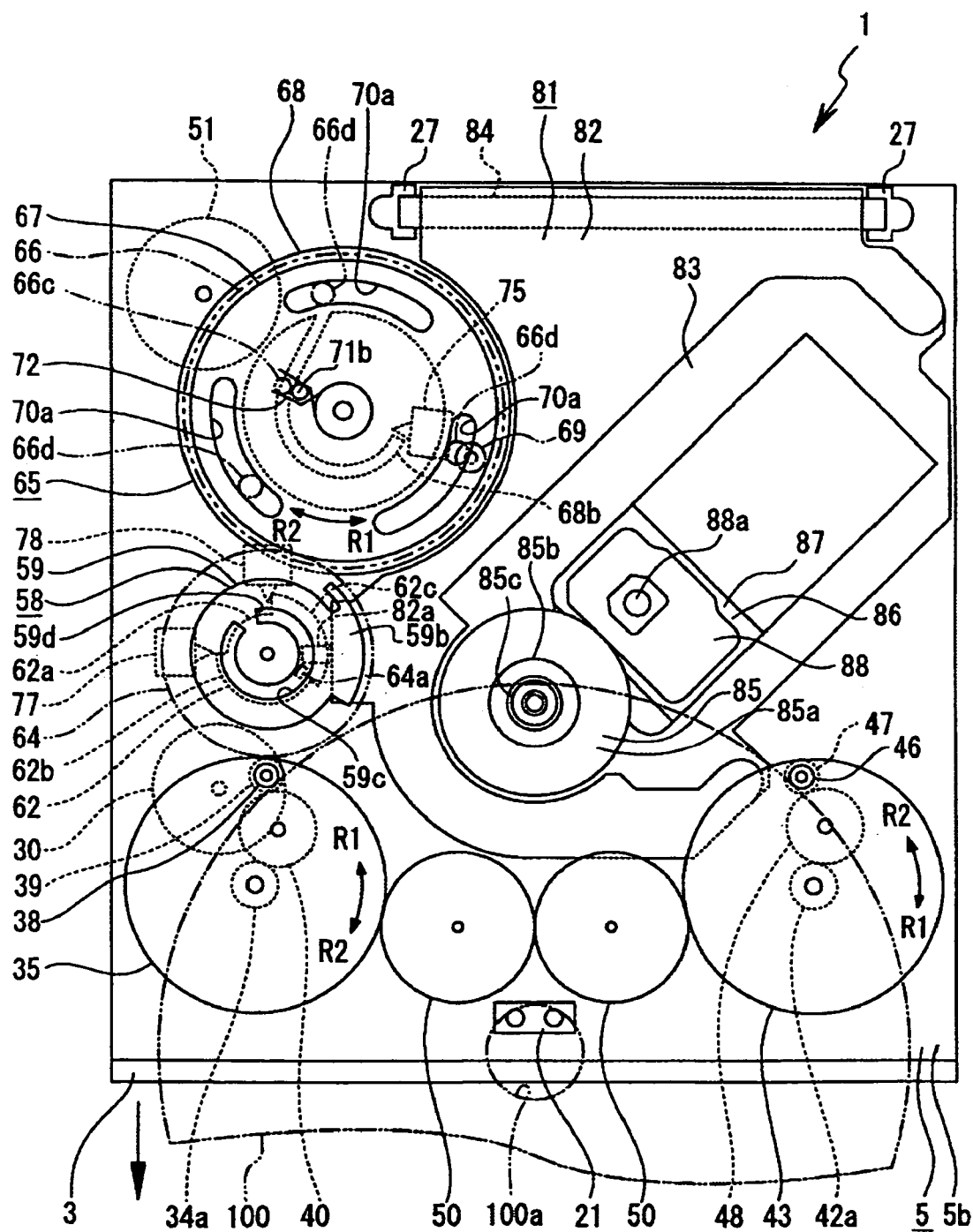
FIG. 29 is a schematic view showing the disk-type recording medium in a state wherein it is fed in the discharging direction from the mounting position.
Figure 30:
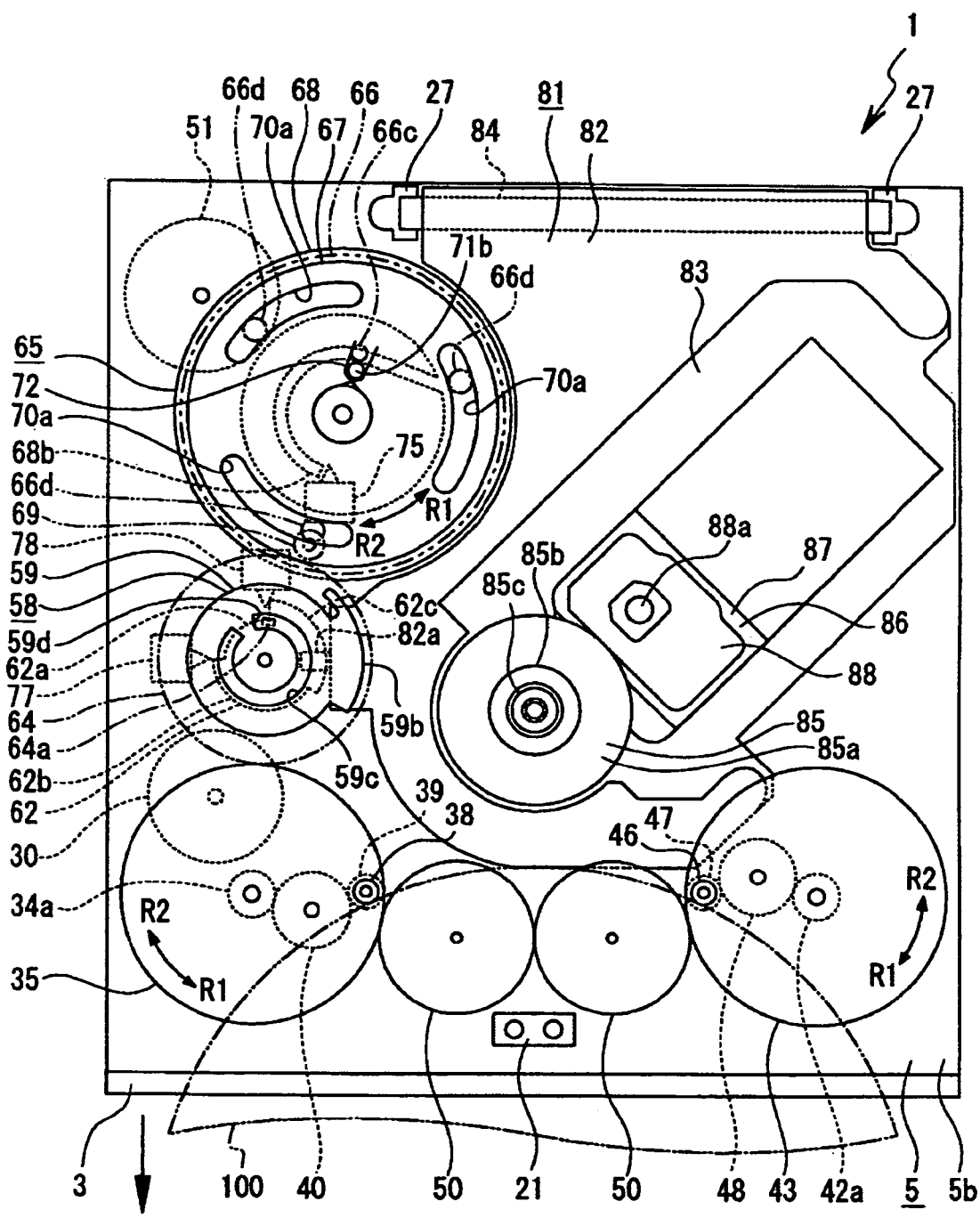
FIG. 30 is a schematic view showing the disk-type recording medium in a state wherein a feeding movement thereof in the discharging direction is completed.

After the drive motor 51 is reversed, the cam gear 58 is rotated in the clockwise direction as viewed in plan, and the meshing engagement between the mating gear 59b and the switching gear 68 of the sub gear 65 is canceled (refer to FIG. 29). By the rotation of the cam gear 58, the operation of the second detection switch 77 by the active portion 62c is canceled so that the second detection switch 77 is placed into an OFF state (refer to E5 of FIG. 16), and the operation of the third detection switch 78 by the active portion 62c is canceled so that the third detection switch 78 is placed into an OFF state (refer to F6 of FIG. 16). As the third detection switch 78 is placed into an OFF state, the rotation of the drive motor 51 is stopped (refer to C6 of FIG. 16) and the cam gear 58 is stopped at its initial position (refer to FIG. 29).

The feed motor 30 still continues to rotate and the disk-type recording medium 100 still continues to be fed forwardly by the rotation of the feed rollers 38 and 46 (refer to FIG. 29). The feed rollers 38 and 46 roll on the outer circumferential face of the disk-type recording medium 100 and the main gears 35 and 43 are rotated in the R2 directions by the biasing force of the torsion coil springs 37 and 45, respectively, and also the sub gear 65 is rotated in the R2 direction in synchronism with the main gears 35 and 43.

When the disk-type recording medium 100 is fed forwardly and the center hole 100*a* thereof passes above the disk detection sensor 21, the detection of the disk-type recording medium 100 by the disk detection sensor 21 is not performed temporarily (refer to A3 of FIG. 16).

When the disk-type recording medium 100 is fed forwardly and the main gear 43 positioned on the right side is rotated to a predetermined position, the fourth detection switch 79 is operated into an OFF state by the operation projection 49 mounted on the main gear 43 (refer to G3 of FIG. 16). When the fourth detection switch 79 is placed into an OFF state, the rotation of the feed motor 30 is stopped (refer to B5 of FIG. 16) to end the forward feeding movement of the disk-type recording medium 100 and the rotation of the main gears 35 and 43 and the sub gear 65 is stopped. The main gears 35 and 43 and the sub gear 65 are stopped at their respective initial positions (refer to FIG. 30), and the operation projection 49 mounted on the main gear 43 positioned on the right side is placed into a state wherein it contacts with the stopper wall 20.

The disk-type recording medium 100 fed forwardly projects forwardly from the disk slot 3*a* except for a portion thereof (refer to FIG. 30), and the disk-type recording medium 100 can be grasped and taken out. When the disk-type recording medium 100 is taken out, the detection of the disk-type recording medium 100 by the disk detection sensor 21 is not performed any more (refer to A4 of FIG. 16).

As described above, in the disk reproduction apparatus 1, the main gears 35 and 43 rotated around the centers of rotation positioned at equal distances from the center of rotation of the disk table 85 and the feed rollers 38 and 43 supported on the main gears 35 and 43, respectively, for rolling movement on an outer circumferential face of a disk-type recording medium 100 are provided such that the main gears 35 and 43 are rotated based on rotation of the feed rollers 38 and 43, respectively, and the feed rollers 38 and 43 are revolved upon the rotation of the main gears 35 and 43, respectively, thereby to feed the disk-type recording medium 100.

Accordingly, since there is no necessity to provide on the disk table 85 engaging pawls for pressing an inner circumferential edge of the disk-type recording medium 100 to mount the disk-type recording medium 100, damage to and deformation of the disk-type recording medium 100 can be prevented.

Further, since the feed rollers 38 and 46 roll on the outer circumferential face of the disk-type recording medium 100 to rotate the main gears 35 and 43 to feed the disk-type recording medium 100, if the diameter of the disk-type recording medium 100 is within a range equal to or greater than the minimum distance between the feed rollers 38 and 46 but equal to or smaller than the maximum distance between the feed rollers 38 and 46 when the main gears 35 and 43 are rotated, then the disk-type recording medium 100 can be mounted onto the disk table 85 irrespective of the size thereof. Consequently, the single disk reproduction apparatus 1 can reproduce an information signal from a plurality of disk-type recording media 100, 100, . . . having different sizes from each other.

Furthermore, even where the diameter of the disk-type recording medium 100 has a dispersion within a range of the dimensional tolerance, mounting of the disk-type recording medium 100 onto the disk table 85 can be performed with certainty.

In the disk reproduction apparatus 1, since the main gears 35 and 43 are biased in directions of rotation in which the feed rollers 38 and 46 are pressed against the outer circumferential face of the disk-type recording medium 100, a good contacting state between the feed rollers 38 and 46 and the disk-type recording medium 100 can be maintained and a good feeding movement of the disk-type recording medium 100 by the feed rollers 38 and 46 can be achieved.

Further, since the sub gear 65 is provided such that it is rotated around the center of rotation positioned at a distance from the center of rotation of the disk table 85 equal to the distances from the center of rotation of the disk table 85 to the centers of rotation of the main gears 35 and 43 and the control roller 69 is supported on the sub gear 65 such that, when the disk-type recording medium 100 is fed toward the mounting position, the control roller 69 is contacted with the outer circumferential face of the disk-type recording medium 100 to restrict the movement of the disk-type recording medium 100, centering of the disk-type recording medium 100 with respect to the disk table 85 can be performed with certainty.

Furthermore, since the first detection switch 75 is provided in such a manner as to detect, when the disk-type recording medium 100 is fed to the mounting position until it is brought into contact with the control roller 69, arrival of the disk-type recording medium 100 at the mounting position, improvement of the accuracy in centering of the disk-type recording medium 100 can be achieved.

Moreover, since the main gears 35 and 43 are rotated in synchronism with each other, stabilization of the feeding direction and stabilization of the feeding speed of the disk-type recording medium 100 can be achieved.

Besides, since the sub gear 65 is rotated in synchronism with the main gears 35 and 43, there is no displacement in timing of movement between the sub gear 65 and the main gears 35 and 43, and improvement in reliability of a feeding action can be achieved.

In addition, since the sun gear portions 34*a* and 42*a* rotated around the centers of rotation same as those of the main gears 35 and 43, respectively, the feed gears 39 and 47 rotated integrally with the feed rollers 38 and 46 around the centers of rotation same as those of the feed rollers 38 and 46, respectively, and the planet gears 40 and 48 supported on the main gears 35 and 43 and held in meshing engagement with the sun gear portions 34*a* and 42*a* and the feed gears 39 and 47, respectively, are provided, when the feed rollers 38 and 46 rotate, rotating force in the same directions is applied to the main gears 35 and 43, and a normally appropriate feeding movement of the disk-type recording medium 100 can be achieved.

Figure 31:
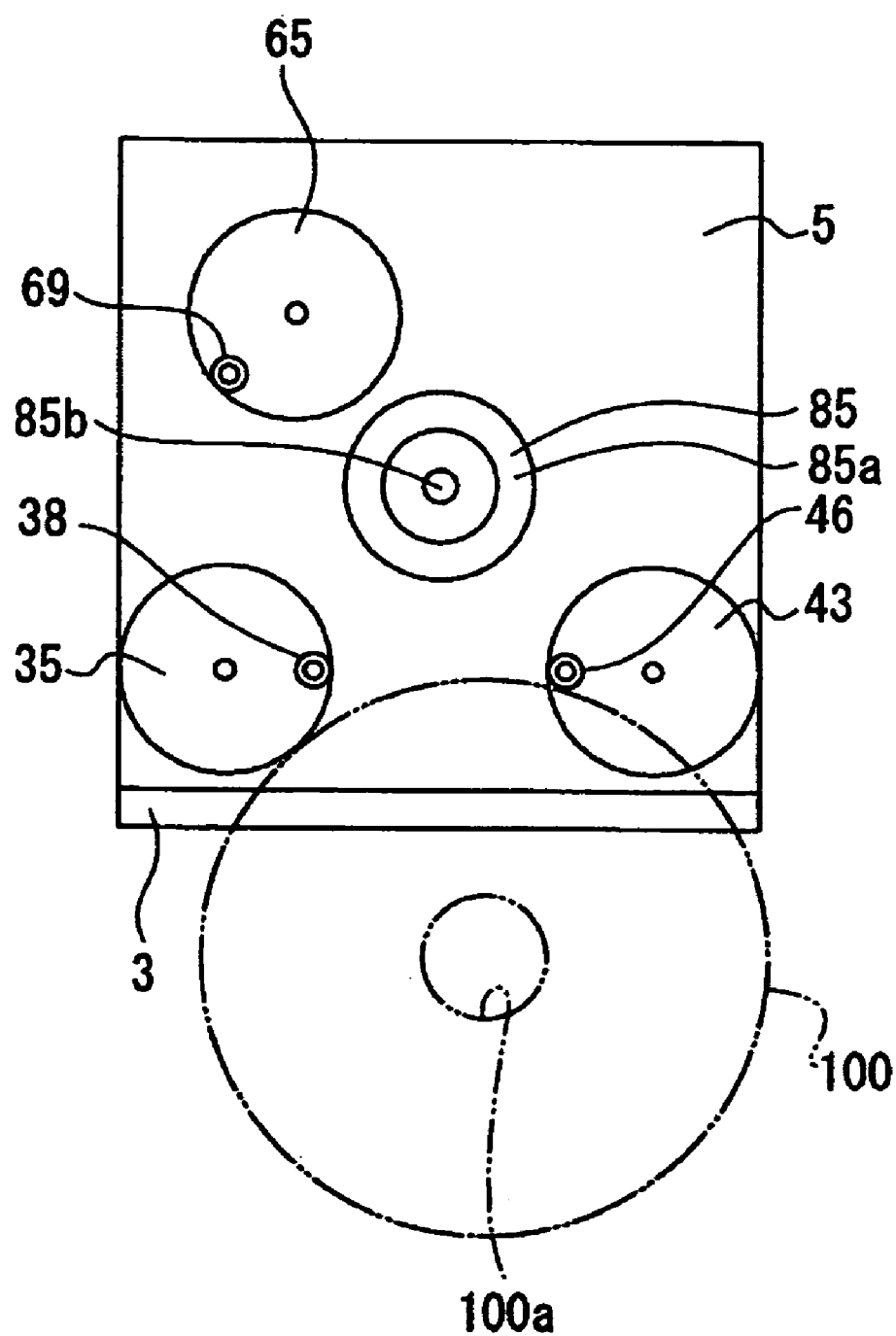
FIG. 31 illustrates a feeding movement when the disk-type recording medium is inserted from a displaced position together with FIGS. 32 and 33 and is a conceptive view showing a state before the feeding movement is started.
Figure 32:
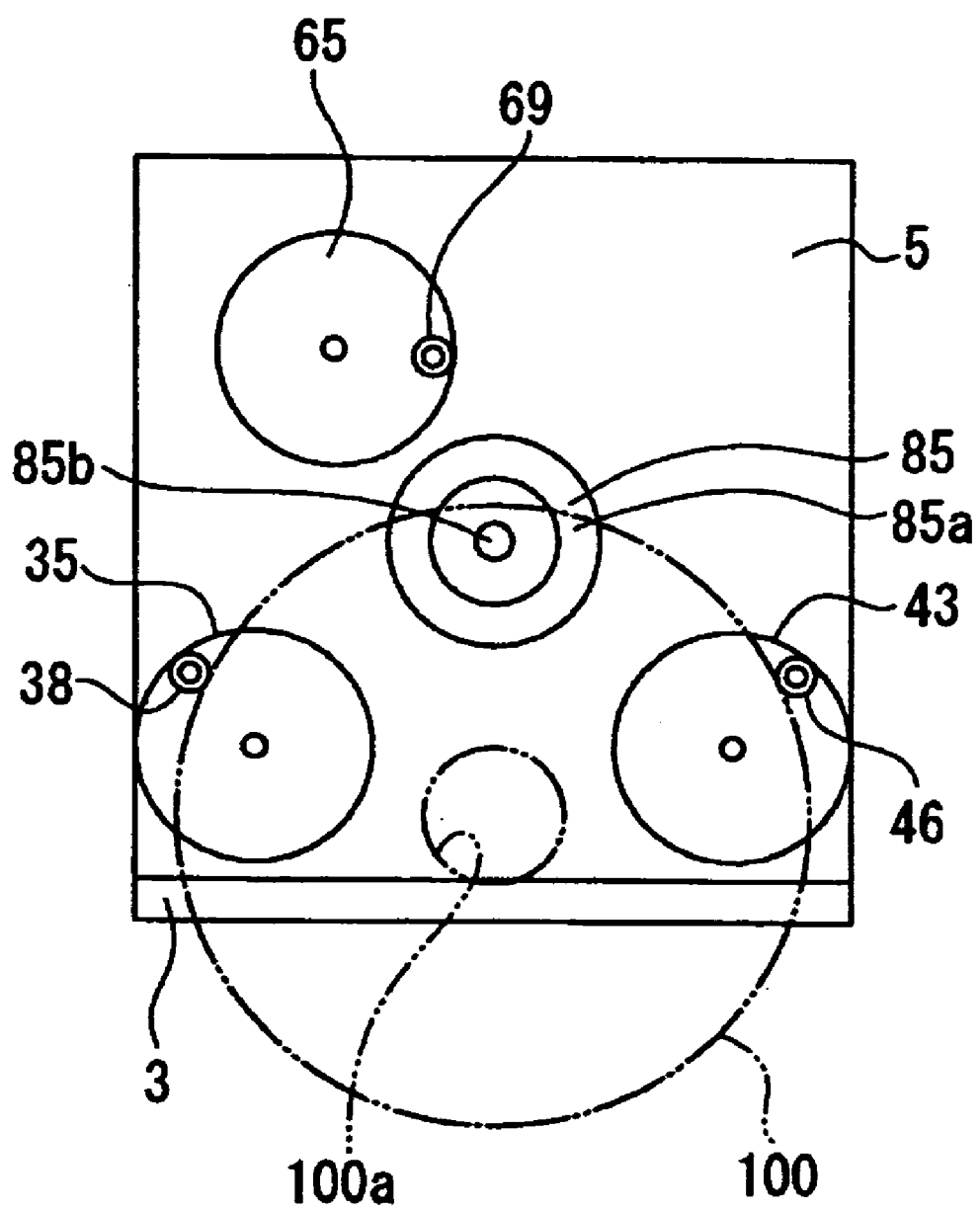
FIG. 32 is a conceptive view showing a state intermediately while the feeding movement is proceeding.
Figure 33:
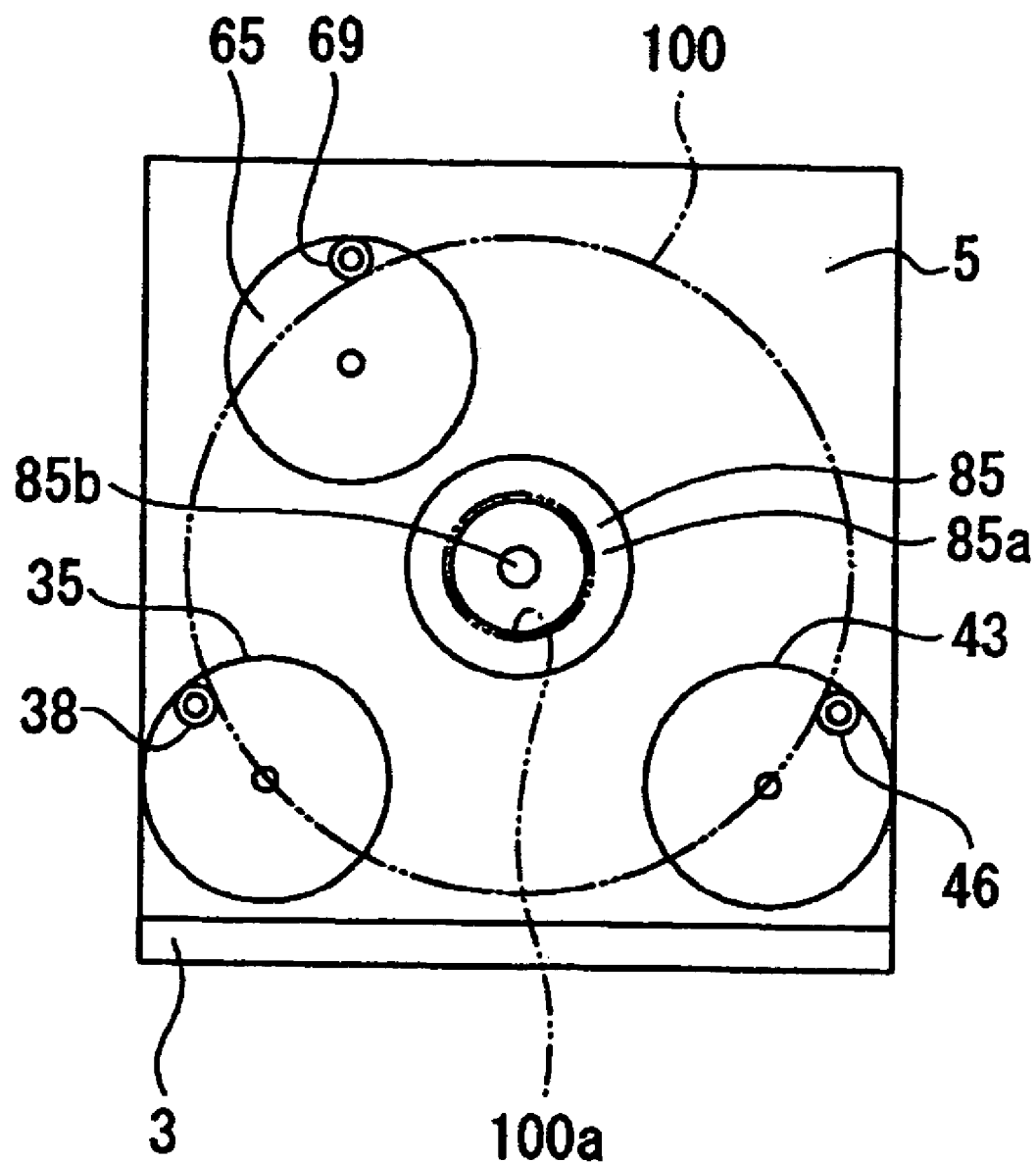
FIG. 33 is a conceptive view showing a state wherein the feeding operation is completed and the disk-type recording medium is mounted on the disk table.

In the disk reproduction apparatus 1, upon insertion of a disk-type recording medium 100 through the disk slot 3*a*, the disk-type recording medium 100 may possibly be inserted from a position displaced leftwardly or rightwardly from the centers of the feed rollers 38 and 46 positioned in their respective initial positions. However, in the disk reproduction apparatus 1, since the disk-type recording medium 100 is fed through contact between the feed rollers 38 and 46 and the outer circumferential face of the disk-type recording medium 100, the disk-type recording medium 100 is fed rearwardly such that it is drawn to the center side through contact thereof with one of the feed roller 38 and the feed roller 46, and an appropriate feeding movement can be achieved (refer to FIGS. 31 to 33).

While, in the description above, the disk reproduction apparatus 1 is described as an apparatus wherein a disk-type recording medium 100 is fed and mounted onto the disk table 85 in a state wherein a main face thereof is directed in a vertical direction and reproduction of an information signal of the disk-type recording medium 100 is performed, since the disk reproduction apparatus 1 is configured such that the disk-type recording medium 100 is fed through contact between the feed rollers 38 and 46 and the outer circumferential face of the disk-type recording medium 100 as described above, the disk reproduction apparatus 1 can be used also as an apparatus of the so-called installed type wherein a disk-type recording medium 100 is fed and mounted onto the disk table 85 in a state wherein a main face thereof is directed horizontally and reproduction of an information signal of the disk-type recording medium 100 is performed.

The particular shapes and structures of the individual components described in connection with the embodiment above are a mere example in carrying out the present invention, and the technical scope of the present invention shall not be interpreted restrictively based on them.

As apparent from the foregoing description, according to the present invention, a disk loading apparatus for feeding a disk-type recording medium inserted through a disk slot to a mounting position for mounting the disk-type recording medium onto a disk table is characterized in that it includes a pair of main gears for being rotated around centers of rotation positioned at equal distances to each other in radial directions of the disk table from a center of rotation of the disk table, and a pair of feed rollers supported for rotation at portions of the pair of main gears other than the centers of rotation for contacting with the disk-type recording medium and rolling on an outer circumferential face of the disk-type recording medium to feed the disk-type recording medium toward the mounting position, and that, when the disk-type recording medium is to be fed toward the mounting position by the pair of feed rollers, the main gears are rotated, based on the rotation of the feed rollers, around the centers of rotation thereof in directions same as the directions of rotation of the feed rollers and the feed rollers are revolved around the centers of rotation of the main gears in response to the rotation of the main gears.

Accordingly, since there is no necessity to provide, on the disk table, engaging pawls for pressing an inner circumferential edge of the disk-type recording medium to mount the disk-type recording medium, damage to and deformation of the disk-type recording medium can be prevented.

Further, since the feed rollers roll on the outer circumferential face of the disk-type recording medium to rotate the main gears to feed the disk-type recording medium, if the diameter of the disk-type recording medium is within a range equal to or greater than the minimum distance between the feed rollers but equal to or smaller than the maximum distance between the feed rollers when the main gears are rotated, then the disk-type recording medium can be mounted onto the disk table irrespective of the size thereof.

Furthermore, even where the diameter of the disk-type recording medium has a dispersion within a range of the dimensional tolerance, mounting of the disk-type recording medium onto the mechanism chassis can be performed with certainty.

In the present invention, since the pair of main gears are biased in the directions of rotation in which the feed rollers are pressed against the outer circumferential face of the disk-type recording medium, a good contacting state between the feed rollers and the disk-type recording medium can be maintained and a good feeding movement of the disk-type recording medium by the feed rollers can be achieved.

In the present invention, since the sub gear is provided such that it is rotated around the center of rotation positioned at a distance from the center of rotation of the disk table equal to the distances from the center of rotation of the disk table to the centers of rotation of the main gears and the control element is supported at a portion of the sub gear other than the center of rotation such that, when the disk-type recording medium is fed toward the mounting position, the control element is contacted with the outer circumferential face of the disk-type recording medium to restrict the movement of the disk-type recording medium toward the mounting position, centering of the disk-type recording medium with respect to the disk table can be performed with certainty.

In the present invention, since the detection switch for detecting, when the disk-type recording medium is fed to the mounting position until it is brought into contact with the control element, arrival of the disk-type recording medium at the mounting position is provided, improvement of the accuracy in centering of the disk-type recording medium can be achieved.

In the present invention, since the feed rollers are rotated in the directions opposite to the directions of rotation thereof when the disk-type recording medium is fed toward the mounting position to feed the disk-type recording medium from the mounting position toward the disk slot and, when the feeding movement of the disk-type recording medium toward the disk slot by the feed rollers is started, the control element presses the disk-type recording medium toward the disk slot side as the sub gear rotates, the disk-type recording medium can be fed in the discharging direction with certainty and discharging of the disk-type recording medium can be performed with certainty.

In the present invention, since synchronization means for rotating the pair of main gears in synchronism with each other is provided, stabilization of the feeding direction and stabilization of the feeding speed of the disk-type recording medium can be achieved.

In the present invention, since synchronization means for rotating the sub gear in synchronism with the pair of main gears, there is no displacement in timing of movement between the sub gear and the main gears, and improvement in reliability of a feeding action can be achieved.

In the present invention, since sun gear portions having a diameter smaller than that of the main gears and rotated around the centers of rotation same as those of the main gears, feed gears rotated integrally with the feed rollers around the centers of rotation same as those of the feed rollers, and planet gears supported for rotation at portions of the main gears other than the centers of rotation and held in meshing engagement with the sun gear portions and the feed gears are provided, when the feed rollers rotate, rotating force in the same directions is applied to the main gears, and a normally appropriate feeding movement of the disk-type recording medium can be achieved.

According to the present invention, a recording and/or reproduction apparatus which includes a disk loading mechanism for feeding a disk-type recording medium inserted through a disk slot to a mounting position for mounting the disk-type recording medium onto a disk table and performs recording and/or reproduction of an information signal onto or from the disk-type recording medium mounted on the disk table is characterized in that it includes a pair of main gears for being rotated around centers of rotation positioned at equal distances to each other in radial directions of the disk table from a center of rotation of the disk table, and a pair of feed rollers supported for rotation at portions of the pair of main gears other than the centers of rotation for contacting with the disk-type recording medium and rolling on an outer circumferential face of the disk-type recording medium to feed the disk-type recording medium toward the mounting position, and that, when the disk-type recording medium is to be fed toward the mounting position by the pair of feed rollers, the main gears are rotated, based on the rotation of the feed rollers, around the centers of rotation thereof in directions same as the directions of rotation of the feed rollers and the feed rollers are revolved around the centers of rotation of the main gears in response to the rotation of the main gears.

Accordingly, since there is no necessity to provide, on the disk table, engaging pawls for pressing an inner circumferential edge of the disk-type recording medium to mount the disk-type recording medium, damage to and deformation of the disk-type recording medium can be prevented.

Further, since the feed rollers roll on the outer circumferential face of the disk-type recording medium to rotate the main gears to feed the disk-type recording medium, if the diameter of the disk-type recording medium is within a range equal to or greater than the minimum distance between the feed rollers but equal to or smaller than the maximum distance between the feed rollers when the main gears are rotated, then the disk-type recording medium can be mounted onto the disk table irrespective of the size thereof. Consequently, the single disk recording and/or reproduction apparatus can record and/or reproduce an information signal onto or from a plurality of disk-type recording media having different sizes from each other.

Furthermore, even where the diameter of the disk-type recording medium has a dispersion within a range of the dimensional tolerance, mounting of the disk-type recording medium onto the disk table can be performed with certainty.

In the present invention, since the main gears are biased in the directions of rotation in which the feed rollers are pressed against the outer circumferential face of the disk-type recording medium, a good contacting state between the feed rollers and the disk-type recording medium can be maintained and a good feeding movement of the disk-type recording medium by the feed rollers can be achieved.

In the present invention, since the sub gear is provided such that it is rotated around the center of rotation positioned at a distance from the center of rotation of the disk table equal to the distances from the center of rotation of the disk table to the centers of rotation of the main gears and the control element is provided at a portion of the sub gear other than the center of rotation such that, when the disk-type recording medium is fed toward the mounting position, the control element is contacted with the outer circumferential face of the disk-type recording medium to restrict the movement of the disk-type recording medium toward the mounting position, centering of the disk-type recording medium with respect to the disk table can be performed with certainty.

In the present invention, since the detection switch for detecting, when the disk-type recording medium is fed to the mounting position until it is brought into contact with the control element, arrival of the disk-type recording medium at the mounting position is provided, improvement of the accuracy in centering of the disk-type recording medium can be achieved.

In the present invention, since the feed rollers are rotated in the directions opposite to the directions of rotation thereof when the disk-type recording medium is fed toward the mounting position to feed the disk-type recording medium from the mounting position toward the disk slot and, when the feeding movement of the disk-type recording medium toward the disk slot by the feed rollers is started, the control element presses the disk-type recording medium toward the disk slot side as the sub gear rotates, the disk-type recording medium can be fed in the discharging direction with certainty and discharging of the disk-type recording medium can be performed with certainty.

In the present invention, since synchronization means for rotating the pair of main gears in synchronism with each other is provided, stabilization of the feeding direction and stabilization of the feeding speed of the disk-type recording medium can be achieved.

In the present invention, since synchronization means for rotating the sub gear in synchronism with the pair of main gears, there is no displacement in timing of movement between the sub gear and the main gears, and improvement in reliability of a feeding action can be achieved.

In the present invention, since sun gear portions having a diameter smaller than that of the main gears and rotated around the centers of rotation same as those of the main gears, feed gears rotated integrally with the feed rollers around the centers of rotation same as those of the feed rollers, and planet gears supported for rotation at portions of the main gears other than the centers of rotation and held in meshing engagement with the sun gear portions and the feed gears are provided, when the feed rollers rotate, rotating force in the same directions is applied to the main gears, and a normally appropriate feeding movement of the disk-type recording medium can be achieved.

The invention claimed is:

1. A disk loading apparatus, comprising:
    first and second main gears disposed at equal distances to each other in radial directions from a center of rotation of a disk-type recording medium at an insertion completion position of the disk-type recording medium;
    a first feed roller provided at a position on said first main gear displaced from a center of rotation of said first main gear for rolling on an outer circumferential face of the disk-type recording medium;
    a second feed roller provided at a position on said second main gear displaced from a center of rotation of said second main gear for rolling on the outer circumferential face of the disk-type recording medium; and
    a driving mechanism for rotating said first main gear and said second main gear such that, when the disk-type recording medium is to be moved toward the insertion completion position, said first feed roller and said second feed roller revolve on said first main gear and said second main gear, respectively, while said first feed roller and said second feed roller roll on the outer circumferential face of the disk-type recording medium.

2. A disk loading apparatus according to claim 1, wherein said second feed roller is disposed on the opposite side to said first feed roller with respect to the center of the disk-type recording medium moved toward the insertion completion position.

3. A disk loading apparatus according to claim 1, wherein said apparatus further comprises a first biasing member for biasing said first main gear in a predetermined position and a second biasing member for biasing said second main gear in a predetermined position, and said first main gear and second main gear are rotated against the biasing force of said first biasing member and said second biasing member, respectively, when the disk-type recording medium moves toward the insertion completion position.

4. A disk loading apparatus according to claim 1, wherein said first main gear and said second main gear are rotated in the directions in which said first main gear and said second main gear are biased by said first biasing member and said second biasing member, respectively, when the disk-type recording medium is moved toward the insertion completion position after the center of the disk-type recording medium exceeds a straight line interconnecting said first main gear and said second main gear.

5. A disk loading apparatus according to claim 4, wherein said driving mechanism is formed from a gear mechanism for rotating said first main gear and said second main gear in synchronism with each other.

6. A disk loading apparatus according to claim 1, wherein said first feed roller is biased in a direction in which said first feed roller is pressed against the outer circumferential face of the disk-type recording medium, and also said second feed roller is biased in a direction in which said second feed roller is pressed against the outer circumferential face of the disk-type recording medium.

7. A disk loading apparatus according to claim 1, wherein said apparatus further comprises a control roller provided at a position displaced from the center of rotation, and a sub gear disposed at a position at a distance equal to the distance from the center of rotation of the disk-type recording medium to said first main gear or said second main gear in a radial direction from the center of rotation of the disk-type recording medium at the insertion completion position.

8. A disk loading apparatus according to claim 7, wherein said control roller is positioned, in a state thereof before the disk-type recording medium is inserted, at a position displaced from a straight line interconnecting the center of rotation of said sub gear and the center of rotation of the disk-type recording medium at the insertion completion position.

9. A disk loading apparatus according to claim 7, wherein said apparatus further comprises an interlocking gear mechanism for rotating said sub gear and said first main gear in an interlocking relationship with each other.

10. A disk loading apparatus according to claim 9, wherein said apparatus further comprises a limiter mechanism for said sub gear.

11. A disk loading apparatus according to claim 10, wherein said apparatus further comprises a first biasing member for biasing said first main gear in a predetermined direction and a second biasing member for biasing said second main gear in a predetermined direction, and said first main gear and said second main gear are rotated against the biasing force of said first biasing member and said second biasing member, respectively, when the disk-type recording medium is moved toward the insertion completion position.

12. A disk loading apparatus according to claim 11, wherein said first main gear and said second main gear are rotated in the directions in which said first main gear and said second main gear are biased by said first biasing member and said second biasing member, respectively, when the disk-type recording medium is moved toward the insertion completion position after the center of the disk-type recording medium exceeds a straight line interconnecting said first main gear and said second main gear.

13. A disk loading apparatus according to claim 12, wherein said apparatus further comprises a switch for starting and stopping action of said driving mechanism, and said switch is operated by said limiter mechanism to stop the driving by said driving mechanism when said first and second main gears are rotated in the directions in which said first and second main gears are biased by said first and second biasing members, respectively, in a state wherein said control roller contacts with the outer circumferential face of the disk-type recording medium.

14. A disk loading apparatus according to claim 7, wherein, upon discharging action of the disk-type recording medium, the disk-type recording medium is moved toward a discharging direction from the insertion completion position by said control roller.

15. A disk loading apparatus according to claim 1, wherein said apparatus further comprises a detection section disposed at a position between said first main gear and said second main gear on the upstream side of the movement of the disk-type recording medium toward the insertion completion position with respect to a line interconnecting said first main gear and said second main gear for detecting insertion of the disk-type recording medium.

16. A recording and/or reproduction apparatus, comprising:
    first and second main gears disposed at equal distances to each other in radial directions from a center of rotation of a disk-type recording medium at an insertion completion position of the disk-type recording medium;
    a first feed roller provided at a position on said first main gear displaced from a center of rotation of said first main gear for rolling on an outer circumferential face of the disk-type recording medium;
    a second feed roller provided at a position on said second main gear displaced from a center of rotation of said second main gear for rolling on the outer circumferential face of the disk-type recording medium;
    a driving mechanism for rotating said first main gear and said second main gear such that, when the disk-type recording medium is to be moved toward the insertion completion position, said first feed roller and said second feed roller revolve on said first main gear and said second main gear, respectively, while said first feed roller and said second feed roller roll on the outer circumferential face of the disk-type recording medium;
    a recording and/or reproduction section for performing a recording or reproduction action onto or from the disk-type recording medium moved to the insertion completion position; and
    a lifting driving mechanism for positioning said recording and/or reproduction section at a lowered position before the disk-type recording medium arrives at the insertion completion position but moving, when the disk-type recording medium arrives at the insertion completion position, said recording and/or reproduction section to a lifted position at which said recording and/or reproduction section performs recording or reproduction onto or from the disk-type recording medium.

17. A recording and/or reproduction apparatus according to claim 16, wherein
    said second feed roller is disposed on the opposite side to said first feed roller with respect to the center of the disk-type recording medium moved toward the insertion completion position, and
    said apparatus further comprises a control roller provided at a position displaced from the center of rotation, and a sub gear disposed at a position at a distance equal to the distance from the center of rotation of the disk-type recording medium to said first main gear or said second main gear in a radial direction from the center of rotation of the disk-type recording medium at the insertion completion position.

18. A recording and/or reproduction apparatus according to claim 17, wherein said control roller is positioned, in a state thereof before the disk-type recording medium is inserted, at a position displaced from a straight line interconnecting the center of rotation of said sub gear and the center of rotation of the disk-type recording medium at the insertion completion position.

19. A recording and/or reproduction apparatus according to claim 17, wherein said apparatus further comprises an interlocking gear mechanism for rotating said sub gear and said first main gear in an interlocking relationship with each other.

20. A recording and/or reproduction apparatus according to claim 19, wherein said lifting driving mechanism includes a rotational cam mechanism section for moving said recording and/or reproduction section between the lowered position and the lifted position, and said interlocking gear is provided coaxially with said rotational cam mechanism section.

21. A recording and/or reproduction apparatus according to claim 20, wherein said first feed roller, said second feed roller and said control roller are spaced away from the outer circumferential face of the disk-type recording medium when said interlocking gear is rotated by said rotational cam mechanism section after said recording and/or reproduction section is moved to the lifted position by said lifting driving mechanism.

22. A recording and/or reproduction apparatus according to claim 21, wherein, when the disk-type recording medium arrives at the insertion completion position, said first feed roller, said second feed roller and said control roller are already pressed against the disk-type recording medium.

23. A recording and/or reproduction apparatus according to claim 20, wherein said apparatus further comprises a detection switch operable by said rotational cam mechanism section such that, when said detection switch is operated by said rotational cam mechanism section, the action of said lifting driving mechanism is stopped.

24. A recording and/or reproduction apparatus according to claim 20, wherein, when the disk-type recording medium is to be discharged, said recording and/or reproduction section is moved to the lowered position by said lifting driving mechanism and said first feed roller, said second feed roller and said control roller are pressed against the disk-type recording medium.

25. A recording and/or reproduction apparatus according to claim 24, wherein, when the disk-type recording medium is to be discharged, the disk-type recording medium is moved toward a discharging direction from the insertion completion position by said control roller.

26. A recording and/or reproduction apparatus according to claim 25, wherein said apparatus further comprises a first biasing member for biasing said first main gear in a predetermined direction and a second biasing member for biasing said second main gear in a predetermined direction, and when the disk-type recording medium is to be discharged, said first main gear and said second main gear are rotated in synchronism with each other in the directions in which said first main gear and said second main gear are biased by said first biasing member and said second biasing member, respectively.

27. A recording and/or reproduction apparatus according to claim 17, wherein said apparatus further comprises a limiter mechanism for said sub gear.

28. A recording and/or reproduction apparatus according to claim 27, wherein said apparatus further comprises a first biasing member for biasing said first main gear in a predetermined direction and a second biasing member for biasing said second main gear in a predetermined direction, and said first main gear and said second main gear are rotated against the biasing force of said first biasing member and said second biasing member, respectively, when the disk-type recording medium is moved toward the insertion completion position.

29. A recording and/or reproduction apparatus according to claim 28, wherein said first main gear and said second main gear are rotated in the directions in which said first main gear and said second main gear are biased by said first biasing member and said second biasing member, respectively, when the disk-type recording medium is moved after the center of the disk-type recording medium exceeds a straight line interconnecting said first main gear and said second main gear.

30. A recording and/or reproduction apparatus according to claim 29, wherein said apparatus further comprises a switch for starting and stopping action of said driving mechanism, and said switch is operated by said limiter mechanism to stop the driving by said driving mechanism when said first and second main gears are rotated in the directions in which said first and second main gears are biased by said first and second biasing members, respectively, in a state wherein said control roller contacts with the outer circumferential face of the disk-type recording medium.

31. A recording and/or reproduction apparatus according to claim 16, wherein said apparatus further comprises a detection section disposed at a position between said first main gear and said second main gear on the upstream side of the movement of the disk-type recording medium toward the insertion completion position with respect to a line interconnecting said first main gear and said second main gear for detecting insertion of the disk-type recording medium.

* * * * *